(12) United States Patent  
Shimizu et al.

(10) Patent No.: US 8,421,371 B2
(45) Date of Patent: Apr. 16, 2013

(54) LED DRIVE CIRCUIT, LED ILLUMINATION FIXTURE, LED ILLUMINATION DEVICE, AND LED ILLUMINATION SYSTEM

(75) Inventors: Takayuki Shimizu, Osaka (JP); Hirohisa Warita, Osaka (JP); Atsushi Kanamori, Osaka (JP); Mitsuru Mariyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 312 days.

(21) Appl. No.: 12/987,193

(22) Filed: Jan. 10, 2011

(65) Prior Publication Data

US 2011/0234115 A1    Sep. 29, 2011

(30) Foreign Application Priority Data

Mar. 23, 2010 (JP) ................................ 2010-065876

(51) Int. Cl.
*G05F 1/00* (2006.01)
(52) U.S. Cl.
USPC ........... 315/291; 315/224; 315/300; 315/302; 315/308; 323/300
(58) Field of Classification Search .................. 315/291, 315/224, 194, 294, 295, 297, 300, 302, 308, 315/312, 316, 246, DIG. 4; 323/300; 362/545, 362/555, 612, 613
See application file for complete search history.

(56) References Cited

U.S. PATENT DOCUMENTS

| 7,667,408 | B2 * | 2/2010 | Melanson et al. ......... 315/209 R |
| 7,759,881 | B1 * | 7/2010 | Melanson .................. 315/307 |
| 7,852,017 | B1 * | 12/2010 | Melanson .................. 315/291 |
| 8,339,053 | B2 * | 12/2012 | Yamasaki et al. ......... 315/209 R |
| 2008/0258647 | A1 | 10/2008 | Scianna |
| 2010/0090618 | A1 * | 4/2010 | Veltman .................... 315/307 |
| 2011/0057577 | A1 | 3/2011 | Otake et al. |
| 2011/0109244 | A1 * | 5/2011 | Grajcar .................... 315/294 |
| 2011/0193488 | A1 * | 8/2011 | Kanamori et al. ......... 315/209 R |

FOREIGN PATENT DOCUMENTS

| JP | 3-285289 A | 12/1991 |
| JP | 2005-26142 A | 1/2005 |
| JP | 2005-129512 A | 5/2005 |
| JP | 2006-319172 A | 11/2006 |
| JP | 2007-538378 A | 12/2007 |
| JP | 2009-232625 A | 10/2009 |
| KR | 2007-17092 | 2/2007 |

* cited by examiner

*Primary Examiner* — Haiss Philogene
(74) *Attorney, Agent, or Firm* — Birch, Stewart, Kolasch & Birch, LLP

(57) ABSTRACT

An LED drive circuit in which an alternating voltage is input and an LED is driven, and which can be connected to a phase control dimmer The LED drive circuit is provided with an edge detector for detecting an edge of the output voltage of the phase control dimmer; and a current extractor for extracting a current from a current feed line for feeding an LED drive current to the LED; wherein the value of the current extracted from the current feed line by the current extractor is varied in accordance with the detection results of the edge detector.

21 Claims, 26 Drawing Sheets

WHEN THE PHASE ANGLE AT WHICH THE TRIAC TRI1 SWITCHES ON IS 0°

WHEN THE PHASE ANGLE AT WHICH THE TRIAC TRI1 SWITCHES ON IS 45°

WHEN THE PHASE ANGLE AT WHICH THE TRIAC TRI1 SWITCHES ON IS 90°

WHEN THE PHASE ANGLE AT WHICH THE TRIAC TRI1 SWITCHES ON IS 135°

US 8,421,371 B2

LED DRIVE CIRCUIT, LED ILLUMINATION FIXTURE, LED ILLUMINATION DEVICE, AND LED ILLUMINATION SYSTEM

This nonprovisional application claims priority under 35 U.S.C. §119(a) on Patent Application No. 2010-065876 filed in Japan on Mar. 23, 2010, the entire contents of which are hereby incorporated by reference.

BACKGROUND OF THE INVENTION

1. Field of the Invention

The present invention relates to an LED drive circuit for driving an LED (light emitting diode), as well as to an LED illumination fixture, an LED illumination device, and an LED illumination system having an LED as a light source.

2. Description of the Related Art

LEDs have such characteristics as low current consumption and long service life, and LED applications are expanding not only to display devices but to illumination fixtures and the like. In LED illumination fixtures, a plurality of LED units is often used in order to obtain the desired lighting intensity.

Common illumination fixtures usually use a commercial power supply (AC 100 V to 240 V), and in cases in which an LED illumination fixture is used in place of an incandescent lamp or other common illumination fixture, it is preferred that the LED illumination fixture also be configured to use a commercial power supply (AC 100 V to 240 V), the same as a common illumination fixture.

In the case of applying dimmer control to an incandescent lamp, a phase control dimmer (commonly referred to as an incandescent light control) is used in which dimmer control can easily be applied to the supply of power to the incandescent lamp by a single volume element, by switching on a switching element (usually a thyristor element or triac element) at a certain phase angle of an alternating-current power supply voltage. However, when a phase control dimmer is connected to a low-wattage incandescent lamp, flickering or blinking is known to occur, and normal dimming is not possible.

The ability to connect an existing phase control dimmer for an incandescent lamp without modification is preferred in cases in which dimmer control is applied to an LED illumination fixture that uses an AC power supply. By simply using existing equipment for dimming and changing only the fixture from an incandescent lamp to an LED illumination fixture, a significant reduction in power consumption can be realized relative to using an incandescent lamp. There is also no modification of the dimming equipment to create dimming equipment dedicated for an LED illumination fixture, and compatibility can be maintained, which leads to reduced equipment cost.

FIG. 20 shows an example of a conventional LED illumination system whereby dimmer control can be applied to an LED illumination fixture that uses an alternating-current power supply.

The LED illumination system shown in FIG. 20 is provided with a phase control dimmer 2, an LED drive circuit having a diode bridge DB1 and a current limiting circuit 23, and an LED module 3. The phase control dimmer 2 is connected in series between an alternating-current power supply 1 and the LED drive circuit.

In the phase control dimmer 2, the resistance value of a semi-fixed resistor Rvar1 varies, whereby a triac Tri1 is switched on at a power supply phase angle that is dependent on the resistance value of the semi-fixed resistor Rvar1. The semi-fixed resistor Rvar1 usually has a rotary knob configuration or sliding configuration, and dimmer control can be applied to an illumination fixture by changing the rotation angle of the knob or changing the sliding position of the semi-fixed resistor Rvar1. The phase control dimmer 2 is provided with a noise suppression circuit composed of a capacitor C1 and an inductor L1, and noise fed back to the AC power supply line from the phase control dimmer 2 is reduced by the noise suppression circuit.

FIGS. 21A through 21D show the waveform of the output voltage $V_2$ of the phase control dimmer 2 and the waveform of the output voltage $V_{DB1}$ of the diode bridge DB1 that correspond to phase angles of 0°, 45°, 90°, and 135° at which the triac Tri1 is on. As the phase angle at which the triac Tri1 switches on increases, the average value of the output voltage $V_{DB1}$ of the diode bridge DB1 decreases, and the illumination fixture (LED module 3 in FIG. 20) decreases in brightness.

FIGS. 22A through 22C show examples of the waveform of the voltage $V_3$ across the LED module 3 in the LED illumination system shown in FIG. 20. FIG. 22A shows the waveform of the voltage $V_3$ across the LED module 3 at a bright dimmer level, FIG. 22B shows the waveform of the voltage $V_3$ across the LED module 3 at a dark dimmer level, and FIG. 22C shows the waveform of the voltage $V_3$ across the LED module 3 at an intermediate dimmer level (a level between the bright dimmer level and the dark dimmer level).

In a case in which the bright dimmer level is set, after the triac Tri1 switches from off to on, and the LED module 3 is lit, when the voltage $V_3$ across the LED module 3 drops below the forward voltage $V_F$ of the LED module 3, current no longer flows to the LED module 3, and the triac Tri1 switches off. The voltage $V_3$ across the LED module 3 therefore sharply decreases (see FIG. 22A).

FIG. 23A shows simulation waveforms of the voltage/current of each component of the LED illumination system shown in FIG. 20 in a case in which the bright dimmer level is set. FIG. 23A shows the waveform of the output voltage $V_1$ of the alternating-current power supply 1, the voltage $V_3$ across the LED module 3, and the current $I_3$ flowing to the LED module 3. In the simulation results shown in FIG. 23A, the knob or slider of the semi-fixed resistor Rvar1 is set to the position at which the light intensity of the LED module 3 is at maximum; i.e., the resistance value of the semi-fixed resistor Rvar1 is set to 0Ω. In FIG. 23A, switching on of the triac Tri1 and rising of the voltage $V_3$ across the LED module 3 occur when the phase is 53°. The light intensity of the LED module 3 is proportional to the average current of the LED module 3, and can therefore be estimated from the average current of the LED module 3. The relationship between the average current of the LED module 3 and the resistance value of the semi-fixed resistor Rvar1 is as shown in FIG. 24. Assuming the light intensity of the LED module 3 to be 100% in a state in which the phase control dimmer 2 is not provided, the light intensity of the LED module 3 is 90.5% in the conditions under which the simulation results of FIG. 23A are obtained.

On the other hand, in the case in which the dark dimmer level is set, after the triac Tri1 switches from off to on, and the LED module 3 is lit, when the voltage $V_3$ across the LED module 3 drops below the forward voltage $V_F$ of the LED module 3, current no longer flows to the LED module 3. However, because the phase shift capacitors C2 and C3 are provided in the phase control dimmer 2, current flows to the triac Tri1 from the capacitors C2 and C3, and the triac Tri1 does not switch off (see FIG. 22B).

FIG. 23B shows simulation waveforms of the voltage/current of each component of the LED illumination system shown in FIG. 20 in a case in which the dark dimmer level is set. FIG. 23B shows the waveform of the output voltage $V_1$ of the alternating-current power supply 1, the voltage $V_3$ across the LED module 3, and the current $I_3$ flowing to the LED module 3. FIG. 23B also shows the results of a simulation in which the resistance value of the semi-fixed resistor Rvar1 is 150 kΩ. In FIG. 23B, switching on of the triac Tri1 and rising of the voltage $V_3$ across the LED module 3 occur when the phase is 141°. The light intensity of the LED module 3 is 0.71% in the conditions in which the simulation results of FIG. 23B are obtained.

For example, when the capacitance of the capacitor C2 is 100 nF, the resistance value of the resistor R1 is 5.6 Ωn, and the initial value of the voltage across the capacitor C2 is 141 V, the current flowing from the capacitor C2 takes approximately 900 μs to drop below the hold current (5 mA in this case) of the triac Tri1. Specifically, the holding time of the triac Tri1 by the capacitor C2 is approximately 900 μs. A waveform such as the one shown in FIG. 22A occurs in a case in which current stops flowing to the LED module 3 after 900 μs has elapsed since the triac Tri1 switched on, and a waveform such as the one shown in FIG. 22B occurs in a case in which current stops flowing to the LED module 3 within 900 μs. As shown in FIG. 22C, a waveform in which the waveform shown in FIG. 22A and the waveform shown in FIG. 22B are mixed occurs in a case in which conditions are exactly between those of the two waveforms, i.e., current stops flowing to the LED module 3 900 μs after the triac Tri1 switches on. When the state shown in FIG. 22C occurs, the amount of charge in the capacitor C2 and fluctuation of the time constants of the resistor R1 and capacitor C2 cause the current flowing to the LED module 3 to be unstable, the light flickers, and flickering occurs during low-level dimming.

FIG. 23C shows simulation waveforms of the voltage/current of each component of the LED illumination system shown in FIG. 20 in a case in which the intermediate dimmer level is set. FIG. 23C shows the waveform of the output voltage $V_1$ of the alternating-current power supply 1, the voltage $V_3$ across the LED module 3, and the current $I_3$ flowing to the LED module 3. FIG. 23C also shows the results of a simulation in which the resistance value of the semi-fixed resistor Rvar1 is 135 kΩ. In FIG. 23C, the timing at which the triac Tri1 switches from off to on and the voltage $V_3$ across the LED module 3 rises alternates between a phase of 137° and a phase of 141°. The light intensity of the LED module 3 is 1.58% in the conditions in which the simulation results of FIG. 23C are obtained.

The problem of flickering during low-level dimming described above generally occurs when the light intensity of the LED module 3 is about 1 to 5%, but because there are various types of dimmers, the range of 1 to 5% is merely an approximation, and the problem of flickering during low-level dimming occurs as well at intensities other than 1 to 5%.

Factors such as those described below also cause flickering in the LED module 3 in some cases. When the triac Tri1 of the phase control dimmer 2 switches from off to on, the LED module 3 switches from off to on, and the impedance of the LED module 3 rapidly changes. Ringing thereby occurs at an edge portion in which the output voltage of the phase control dimmer 2 rapidly changes, and during the period in which this ringing occurs, a phenomenon sometimes occurs in which the current flowing to the triac Tri1 oscillates several times between positive and negative, and the triac Tri1 subsequently switches off, after which a trigger occurs, the current flowing to the triac Tri1 again oscillates several times between positive and negative, and the triac Tri1 subsequently switches off This process is repeated, and the LED module 3 flickers.

In a case in which the illumination fixture is an incandescent lamp, since the load is a tungsten or other filament, even when the triac Tri1 of the phase control dimmer 2 switches from off to on, there is minimal fluctuation in the impedance, a state of low impedance is maintained, there is no rapid change in the current flowing to the phase control dimmer 2, and stable dimming operation is possible until the output voltage of the alternating-current power supply 1 is near 0 V.

SUMMARY OF THE INVENTION

An object of the present invention is to provide an LED drive circuit capable of reducing LED flicker, which can occur when the LED drive circuit is used with a phase control dimmer, and to provide an LED illumination fixture, an LED illumination device, and an LED illumination system provided with the LED drive circuit.

The LED drive circuit according to the present invention for achieving the abovementioned objects is an LED drive circuit in which an alternating voltage is input and an LED is driven, and which can be connected to a phase control dimmer; and the LED drive circuit comprises an edge detector for detecting an edge of the output voltage of the phase control dimmer; and a current extractor for extracting a current from a current feed line for feeding an LED drive current to the LED; wherein the value of the current extracted from the current feed line by the current extractor is varied in accordance with the detection results of the edge detector.

A configuration may be adopted in which the current extractor extracts a first extraction current from the current feed line so that a phase control element inside the phase control dimmer does not switch off before the alternating voltage reaches 0 V after the on/off state of the phase control element inside the phase control dimmer switches and the LED emits light; and the current extractor extracts a second extraction current having a value different from that of the first extraction current from the current feed line for a time set in advance when the edge detector detects an edge of the output voltage of the phase control dimmer.

The LED drive circuit may switch between the first extraction current and the second extraction current by switching the value of a reference voltage used by the current extractor.

The LED drive circuit may be configured so as not to operate the current extractor in a case in which the edge detector does not detect an edge of the output voltage of the phase control dimmer for a certain period of time.

The LED drive circuit may comprise a current detector for detecting the LED drive current; and the LED drive circuit may control the on/off state of the current extraction operation of the current extractor by the first extraction current in accordance with the detection results of the current detector.

The LED drive circuit may comprise a current detector for detecting the LED drive current, and the LED drive circuit may vary the value of the first extraction current in accordance with the detection results of the current detector.

The LED drive circuit may comprise a voltage detector for detecting the alternating voltage or a voltage obtained by rectifying the alternating voltage, and the LED drive circuit may vary the value of the first extraction current and the value of the second extraction current in accordance with the detection results of the voltage detector.

The edge detector may be configured so as to be capable of distinguishing between a rising edge and a falling edge.

A coil may be provided further toward the input side of the current feed line than the current extractor, and the second extraction current may have a pulse-shaped waveform.

A configuration may be adopted in which the LED drive circuit comprises a voltage detector for detecting the alternating voltage or a voltage obtained by rectifying the alternating voltage; and a time difference detector for detecting a time difference between a point at which the alternating voltage reaches a near-zero value and a point at which the alternating voltage rapidly changes, in accordance with the detection results of the voltage detector and the detection results of the edge detector; and the LED drive circuit switches between short-circuiting and not short-circuiting the LED in accordance with the detection results of the time difference detector.

The LED drive circuit may comprise a delay unit for delaying the output of the edge detector, and the LED drive circuit may switch between short-circuiting and not short-circuiting the LED in accordance with the output of the delay unit.

The current extractor may have a falling time changing unit capable of changing the falling time of the second extraction current.

The falling time changing unit may have an error amplifier connected to a current output operational amplifier, and a capacitor connected to an output of the error amplifier.

The falling time changing unit may have a peak hold circuit and a discharge circuit.

The LED drive circuit may be configured so as not to switch off the current extraction operation by the first current extraction when the LED is on.

The LED illumination fixture according to the present invention for achieving the abovementioned objects comprises the LED drive circuit according to any of the aspects of the present invention described above, and an LED connected to the output side of the LED drive circuit.

The LED illumination device according to the present invention for achieving the abovementioned objects comprises the LED drive circuit according to any of the aspects of the present invention described above, or the LED illumination fixture according to any of the aspects of the present invention described above.

The LED illumination system according to the present invention for achieving the abovementioned objects comprises the LED illumination fixture according to any of the aspects of the present invention described above, or the LED illumination device according to the present invention as described above, and a phase control dimmer connected to the input side of the LED illumination fixture or the LED illumination device.

According to the present invention, the amount of current extraction can be varied according to the presence of an edge of the output voltage of the phase control dimmer, and flickering of the LED due to multiple causes can therefore be reduced.

DETAILED DESCRIPTION OF PREFERRED EMBODIMENTS

Embodiments of the present invention will be described hereinafter with reference to the drawings.

First Embodiment

Figure 1:
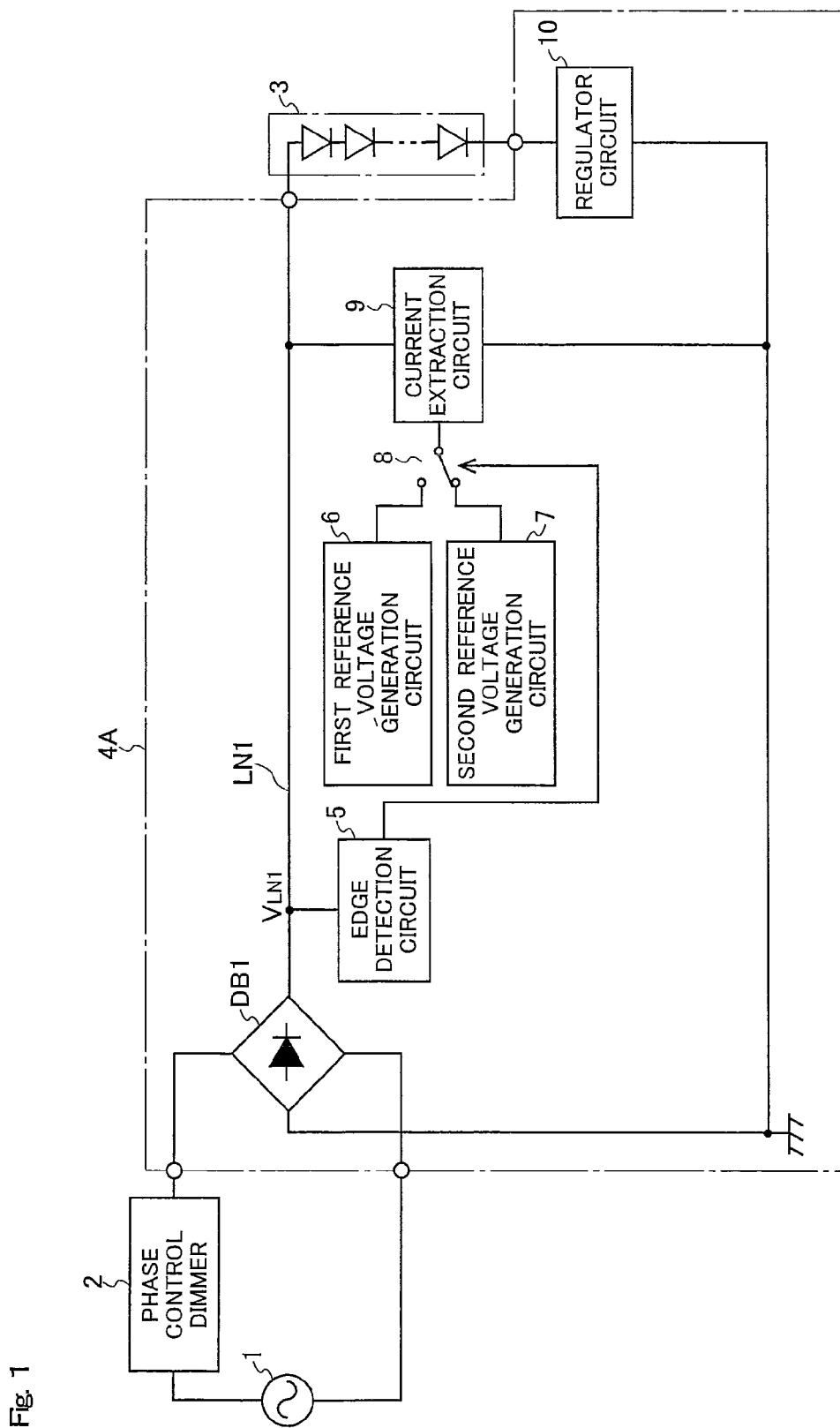
FIG. 1 is a view showing the configuration of the LED illumination system according to a first embodiment of the present invention.

FIG. 1 shows the configuration of the LED illumination system according to a first embodiment of the present invention. The same reference symbols are used in FIG. 1 to refer to components that are the same as those in FIG. 20, and no detailed description thereof will be given. The LED illumination system according to the first embodiment of the present invention shown in FIG. 1 is provided with a phase control dimmer 2, an LED module 3, and an LED drive circuit 4A. The LED drive circuit 4A is an example of the LED drive circuit according to the present invention, and has a diode bridge DB1, an edge detection circuit 5, a first reference voltage generation circuit 6, a second reference voltage generation circuit 7, a switch 8, a current extraction circuit 9, and a regulator circuit 10.

In the LED illumination system according to the first embodiment of the present invention shown in FIG. 1, an alternating-current power supply 1 and the phase control dimmer 2 are connected in series to the input side of the diode bridge DB1, and the regulator circuit 10 and the LED module 3 composed of one or more LEDs are connected in series to the output side of the diode bridge DB1. The current extraction circuit 9 is connected in parallel to a series circuit composed of the LED module 3 and the regulator circuit 10.

Examples of the waveform of the output voltage $V_2$ of the phase control dimmer 2, and examples of the waveform of the output voltage $V_{DB1}$ of the diode bridge DB1 are shown in FIGS. 21A through 21D.

The edge detection circuit 5 detects a rapid change (edge) in the voltage $V_{LN1}$ of a power supply feed line LN1 for feeding an LED drive current to the LED module 3 during operation thereof. The first reference voltage generation circuit 6 generates a first reference voltage, and the second reference voltage generation circuit 7 generates a second reference voltage which has a different value from the first reference voltage.

When the edge detection circuit 5 detects an edge in the voltage $V_{LN1}$, the switch 8 selects the second reference voltage outputted from the second reference voltage generation circuit 7 and feeds the second reference voltage to the current extraction circuit 9. When a predetermined time elapses after the edge detection circuit 5 detects an edge in the voltage $V_{LN1}$, the switch 8 selects the first reference voltage outputted from the first reference voltage generation circuit 6 and feeds the first reference voltage to the current extraction circuit 9. The predetermined time described above is usually set to a time which adequately accommodates the ringing of the output voltage of the phase control dimmer 2.

The current extraction circuit 9 is a circuit for extracting a current from the power supply feed line LN1, and varies the value of the extracted current from the power supply feed line LN1 in accordance with the value of the reference voltage. The value of the extraction current of the current extraction circuit 9 is larger when the second reference voltage is being fed from the switch 8 to the current extraction circuit 9 than when the first reference voltage is being fed from the switch 8 to the current extraction circuit 9.

The regulator circuit 10 is a circuit for causing the LED drive current flowing to the LED module 3 to be constant.

In the ringing period (i.e., the period of several cycles of the resonance wavelength $2\pi\sqrt{(LC)}$ by a capacitor C1 and inductor L1 which constitute a noise prevention filter inside the phase control dimmer 2, where L is the inductance value of the inductor L1, and C is the electrostatic capacitance value of the capacitor C1) of the output voltage of the phase control dimmer 2, the hold current of the triac Tri1 is maintained by the extraction current (extraction current which is in accordance with the second reference voltage) of the current extraction circuit 9, and the triac Tri1 does not switch off. Flickering of the LED module 3 can therefore be reduced when the triac Tri1 of the phase control dimmer 2 switches from off to on.

The hold current of the triac Tri1 is maintained by the extraction current (extraction current which is in accordance with the first reference voltage) of the current extraction circuit 9, and the triac Tri1 does not switch off before the output voltage of the alternating-current power supply 1 reaches 0 V after the triac Tri1 inside the phase control dimmer 2 switches on and the LED module 3 emits light, and it is therefore possible to reduce flickering of the LED module 3 during low-level dimming. Power consumption by the current extraction circuit 9 can also be kept low by setting the extraction current which is in accordance with the first reference voltage to a small value in the range in which the hold current of the triac Tri1 can be adequately maintained.

The value of each extraction current (the extraction current which is in accordance with the first reference voltage, and the extraction current which is in accordance with the second reference voltage) of the current extraction circuit 9 must be set while taking into account the fact that the current extraction circuit 9 extracts not only the current flowing to the triac Tri1, but also currents which do not flow directly to the triac Tri1.

The first reference voltage generation circuit 6 and the second reference voltage generation circuit 7 may also share some or all of the constituent parts thereof.

Second Embodiment

Figure 2:
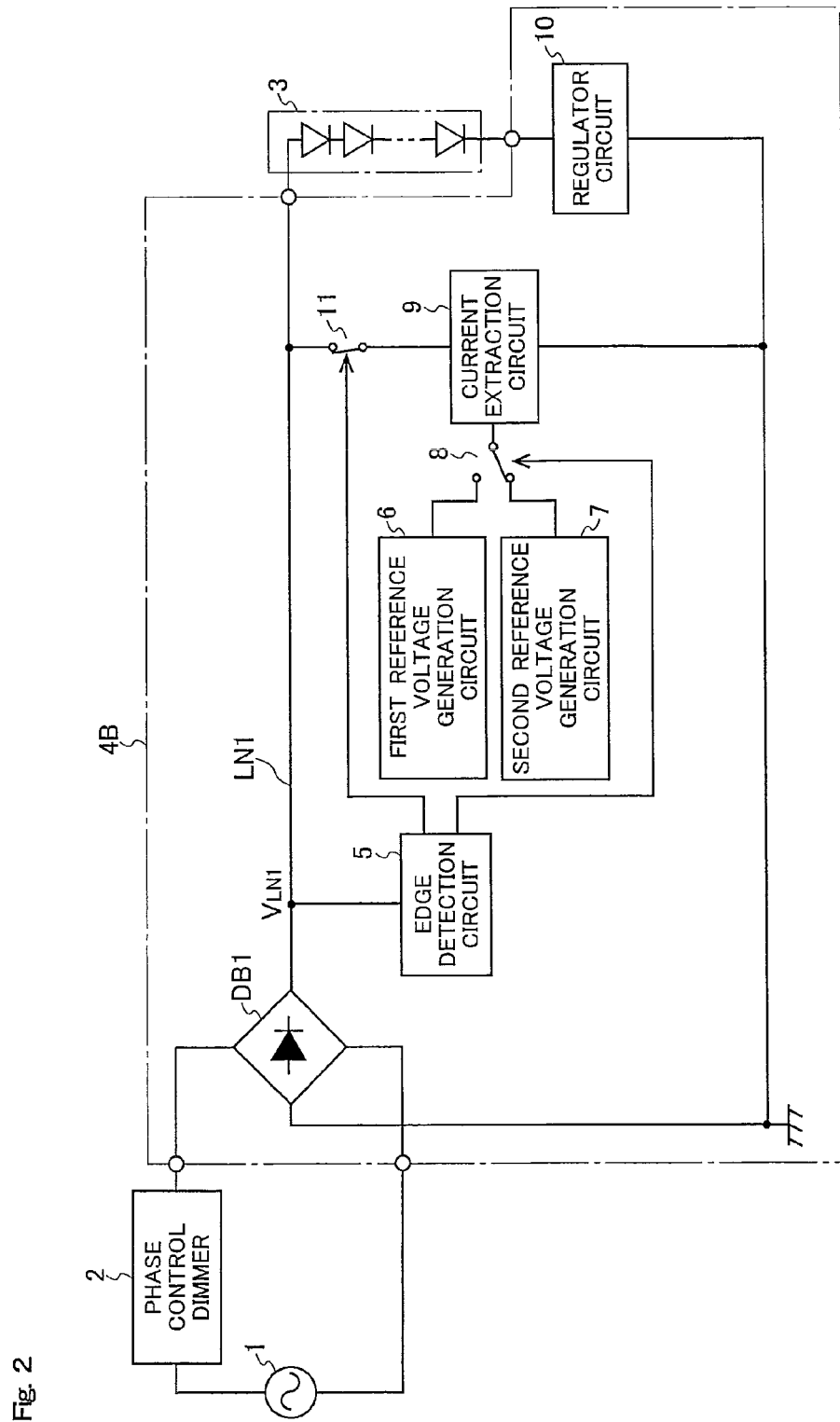
FIG. 2 is a view showing the configuration of the LED illumination system according to a second embodiment of the present invention.

FIG. 2 shows the configuration of the LED illumination system according to a second embodiment of the present invention. The same reference symbols are used in FIG. 2 to refer to components that are the same as those in FIG. 1, and no detailed description thereof will be given. The LED illumination system according to the second embodiment of the present invention shown in FIG. 2 is provided with a phase control dimmer 2, an LED module 3, and an LED drive circuit 4B. The LED drive circuit 4B is an example of the LED drive circuit according to the present invention, and has the configuration of the LED drive circuit 4A described above with the addition of a switch 11.

The switch 11 is provided between the power supply feed line LN1 and the current extraction circuit 9. In a case in which the edge detection circuit 5 does not detect an edge in the voltage $V_{LN1}$ for a certain period of time (e.g., half a cycle of the output voltage of the alternating-current power supply 1), i.e., in a case in which the phase control dimmer 2 is not operating for dimming, or the LED drive circuit 4B is connected directly to the alternating-current power supply 1, unlike in the configuration shown in FIG. 2, the switch 11 switches off so that the current extraction circuit 9 does not extract current.

Since the current extraction operation of the current extraction circuit 9 is not usually necessary when the phase control dimmer 2 is not operating for dimming, or when the LED drive circuit 4B is connected directly to the alternating-current power supply 1, unlike in the configuration shown in FIG. 2, unnecessary power consumption by the current extraction circuit 9 can be eliminated, and efficiency can be enhanced by switching off the switch 11 so that the current extraction circuit 9 does not extract current. Moreover, LED illumination fixtures which are presently classified as products which are dimmer-compatible or incompatible can be used in common, and it is possible to do away with the product distinction of being dimmer-compatible or incompatible.

Third Embodiment

Figure 3:
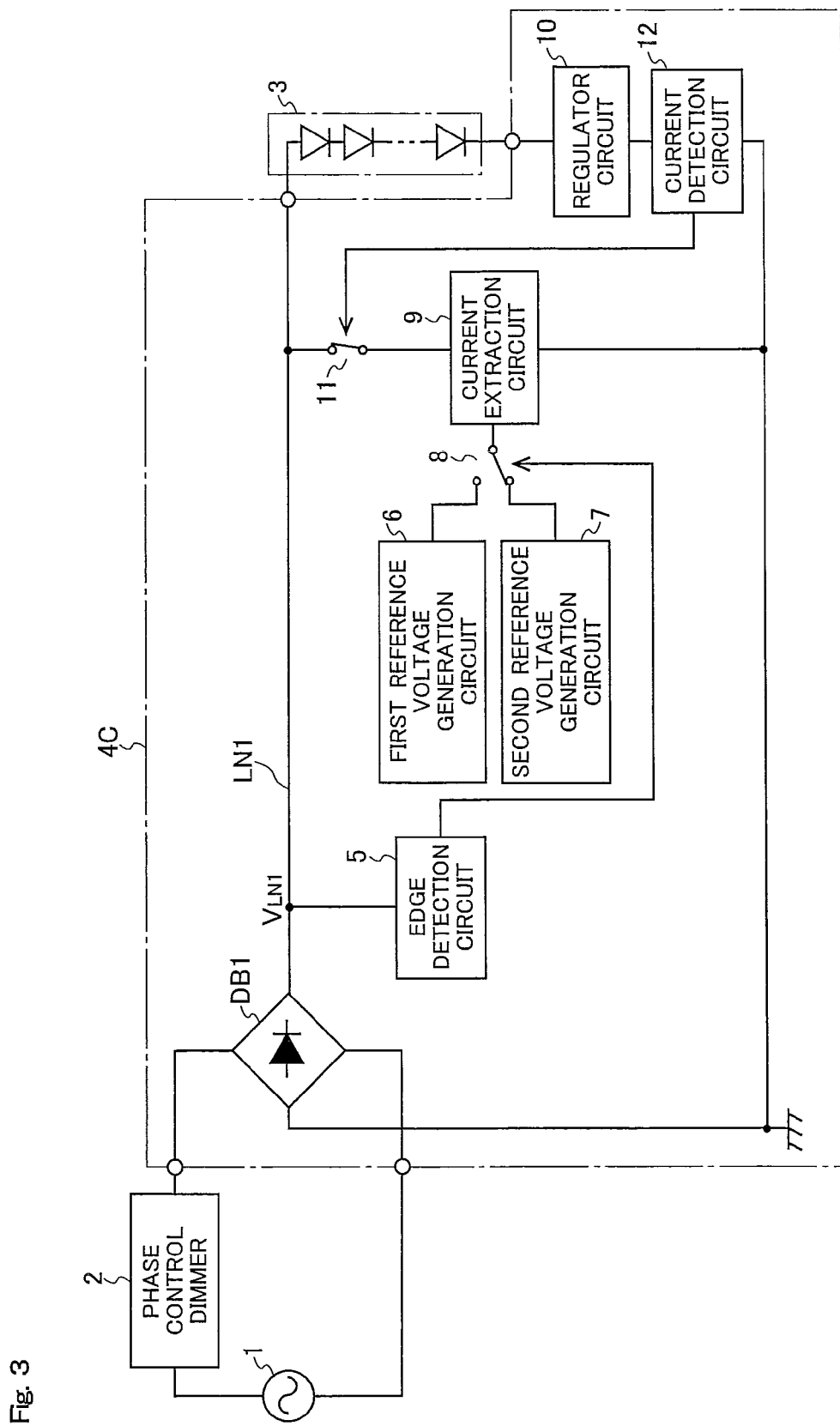
FIG. 3 is a view showing the configuration of the LED illumination system according to a third embodiment of the present invention.

FIG. 3 shows the configuration of the LED illumination system according to a third embodiment of the present invention. The same reference symbols are used in FIG. 3 to refer to components that are the same as those in FIG. 2, and no detailed description thereof will be given. The LED illumination system according to the third embodiment of the present invention shown in FIG. 3 is provided with a phase control dimmer 2, an LED module 3, and an LED drive circuit 4C. The LED drive circuit 4C is an example of the LED drive circuit according to the present invention, and has the configuration of the LED drive circuit 4B described above with the addition of a current detection circuit 12.

The current detection circuit 12 detects the LED drive current flowing to the LED module 3. The switch 11 operates in accordance with the detection results of the current detection circuit 12, rather than the detection results of the edge detection circuit 5. From the perspective of the phase control dimmer 2, a case in which the LED drive current is flowing to the LED module 3 is equivalent to a current being extracted by the current extraction circuit 9. Therefore, in the present embodiment, for the period of time during which the LED drive current detected by the current detection circuit 12 is below a pre-set threshold value, the switch 11 is switched on so that the current extraction circuit 9 extracts current. Since unnecessary current extraction by the current extraction circuit 9 can thereby be reduced, efficiency is enhanced. Moreover, LED illumination fixtures which are presently classified as products which are dimmer-compatible or incompatible can be used in common, and it is possible to dispense with the product distinction of being dimmer-compatible or incompatible.

Fourth Embodiment

Figure 4:
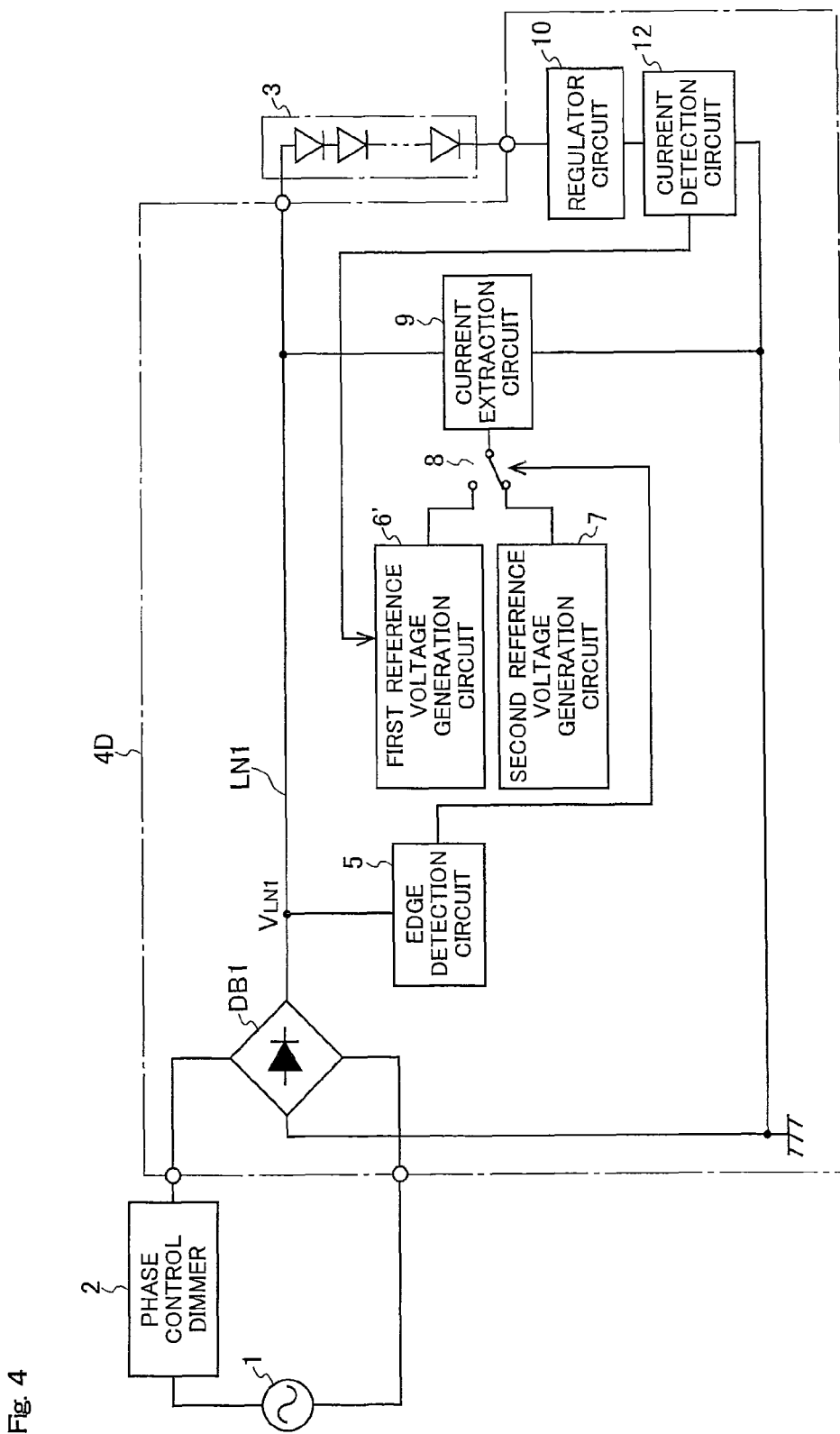
FIG. 4 is a view showing the configuration of the LED illumination system according to a fourth embodiment of the present invention.

FIG. 4 shows the configuration of the LED illumination system according to a fourth embodiment of the present invention. The same reference symbols are used in FIG. 4 to refer to components that are the same as those in FIG. 3, and no detailed description thereof will be given. The LED illumination system according to the fourth embodiment of the present invention shown in FIG. 4 is provided with a phase control dimmer 2, an LED module 3, and an LED drive circuit 4D. The LED drive circuit 4D is an example of the LED drive circuit according to the present invention, and is configured such that the switch 11 is omitted from the configuration of the LED drive circuit 4C described above, and the first reference voltage generation circuit 6 is replaced with a first reference voltage generation circuit 6' which is capable of changing the value of the first reference voltage.

The first reference voltage generation circuit 6' changes the value of the first reference voltage in accordance with the detection results of the current detection circuit 12, so that the sum of the LED drive current flowing to the LED module 3 and the extraction current (extraction current which is in accordance with the first reference voltage) of the current extraction circuit 9 is a certain value. Efficiency is thereby further enhanced.

Fifth Embodiment

Figure 5:
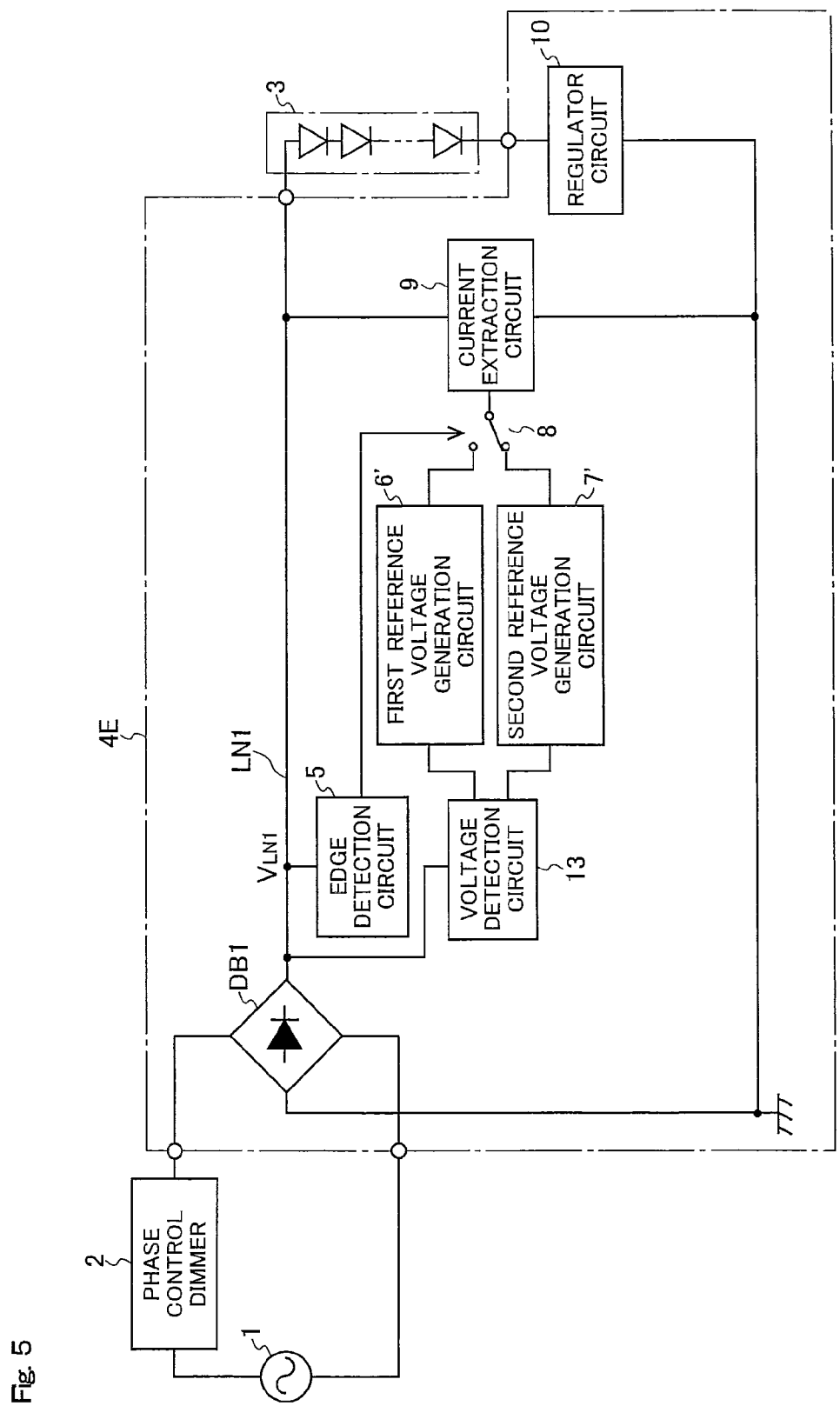
FIG. 5 is a view showing the configuration of the LED illumination system according to a fifth embodiment of the present invention.

FIG. 5 shows the configuration of the LED illumination system according to a fifth embodiment of the present invention. The same reference symbols are used in FIG. 5 to refer to components that are the same as those in FIG. 1, and no detailed description thereof will be given. The LED illumination system according to the fifth embodiment of the present invention shown in FIG. 5 is provided with a phase control dimmer 2, an LED module 3, and an LED drive circuit 4E. The LED drive circuit 4E is an example of the LED drive circuit according to the present invention, and is configured such that a voltage detection circuit 13 is added to the configuration of the LED drive circuit 4A described above, the first reference voltage generation circuit 6 is replaced with the first reference voltage generation circuit 6' which is capable of changing the value of the first reference voltage, and the second reference voltage generation circuit 7 is replaced with a second reference voltage generation circuit 7' which is capable of changing the value of the second reference voltage.

The voltage detection circuit 13 detects the voltage $V_{LN1}$ of the power supply feed line LN1. The first reference voltage generation circuit 6' changes the value of the first reference voltage in accordance with the detection results of the voltage detection circuit 13, and the second reference voltage generation circuit 7' changes the value of the second reference voltage in accordance with the detection results of the voltage detection circuit 13. Commercial alternating-current power supplies vary in the voltage range of 100 V to 240 V in the various countries of the world, and since the optimum value of the extraction current varies according to the voltage value of the alternating-current power supply 1, by adopting a configuration whereby the value of the extraction current of the current extraction circuit 9 is varied in accordance with the voltage $V_{LN1}$ of the power supply feed line LN1 as in the present embodiment, a single type of LED illumination fixture can be compatible with a variety of commercial power supplies.

Sixth Embodiment

Figure 6:
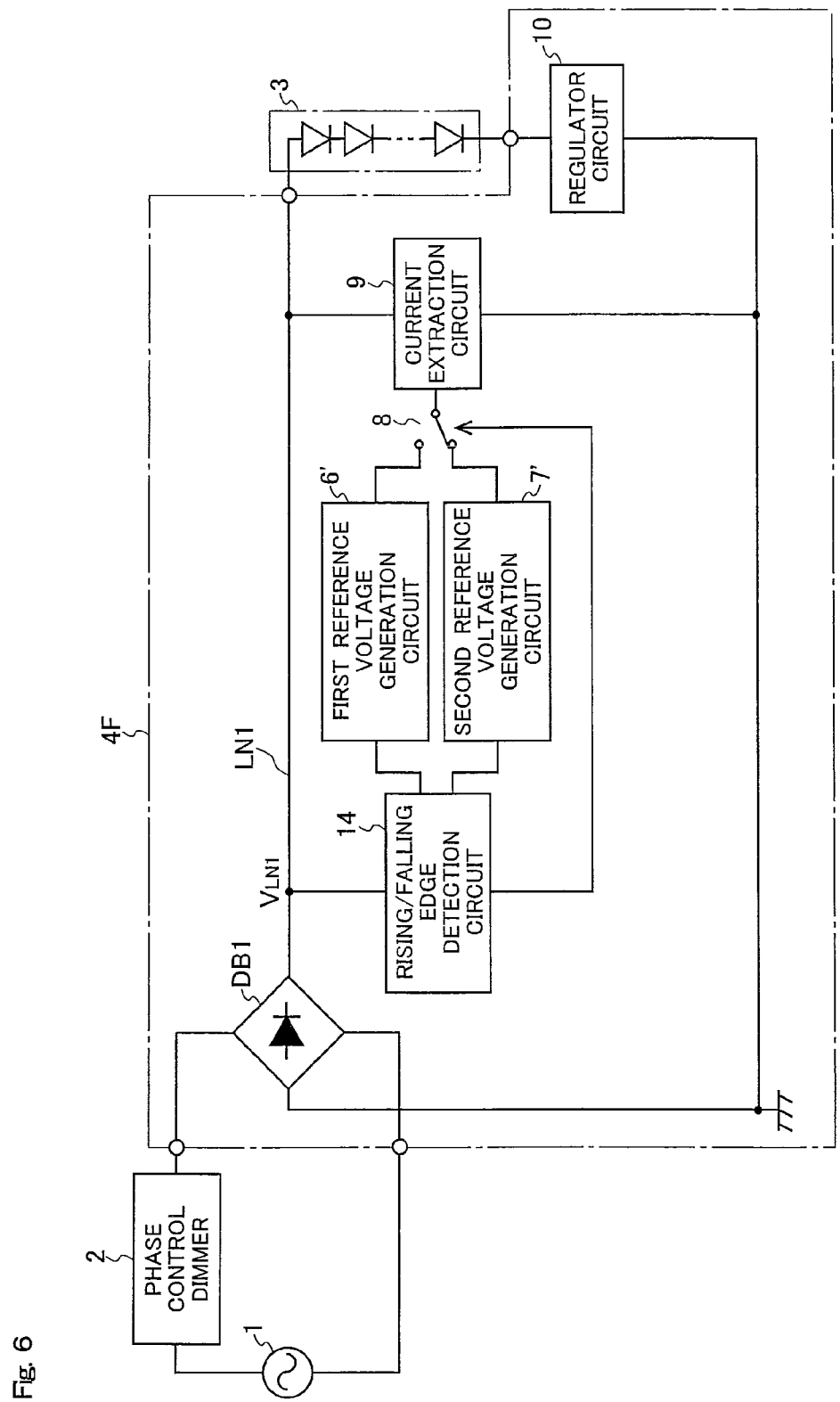
FIG. 6 is a view showing the configuration of the LED illumination system according to a sixth embodiment of the present invention.

FIG. 6 shows the configuration of the LED illumination system according to a sixth embodiment of the present invention. The same reference symbols are used in FIG. 6 to refer to components that are the same as those in FIG. 1, and no detailed description thereof will be given. The LED illumination system according to the sixth embodiment of the present invention shown in FIG. 6 is provided with a phase control dimmer 2, an LED module 3, and an LED drive circuit 4F. The LED drive circuit 4F is an example of the LED drive circuit according to the present invention, and is configured such that the edge detection circuit 5 in the configuration of the LED drive circuit 4A described above is replaced with a rising/falling edge detection circuit 14, the first reference voltage generation circuit 6 is replaced with the first reference voltage generation circuit 6' which is capable of changing the value of the first reference voltage, and the second reference voltage generation circuit 7 is replaced with the second reference voltage generation circuit 7' which is capable of changing the value of the second reference voltage.

Figure 7:
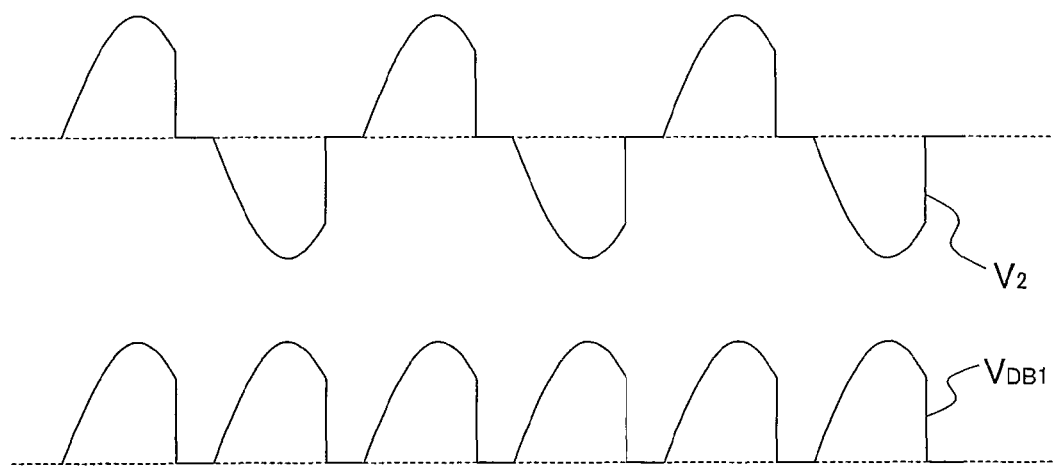
FIG. 7 is a view showing the waveform of the output voltage of the phase control dimmer, and the waveform of the output voltage of the diode bridge.

Phase control dimmers include a type thereof in which phase control is performed by the switching from off to on of a phase control element (see FIGS. 21A through 21D) (e.g., the phase control dimmer 2), as well as a type thereof in which phase control is performed by the switching from on to off of a phase control element (see FIG. 7).

The rising/falling edge detection circuit 14 detects an edge of the voltage $V_{LN1}$ of the power supply feed line LN1, and furthermore determines whether the detected edge is a rising edge or a falling edge. The first reference voltage generation circuit 6' changes the value of the first reference voltage according to whether the edge detected by the rising/falling edge detection circuit 14 is a rising edge or a falling edge, and the second reference voltage generation circuit 7' changes the value of the second reference voltage according to whether the edge detected by the rising/falling edge detection circuit 14 is a rising edge or a falling edge. By thus adopting a configuration in which the value of the extraction current of the current extraction circuit 9 is changed in accordance with the type of the phase control dimmer, the optimum value of the extraction current can be set even for different types of phase control dimmers. Dimming performance and efficiency can thereby both be enhanced.

Seventh Embodiment

Figure 8:
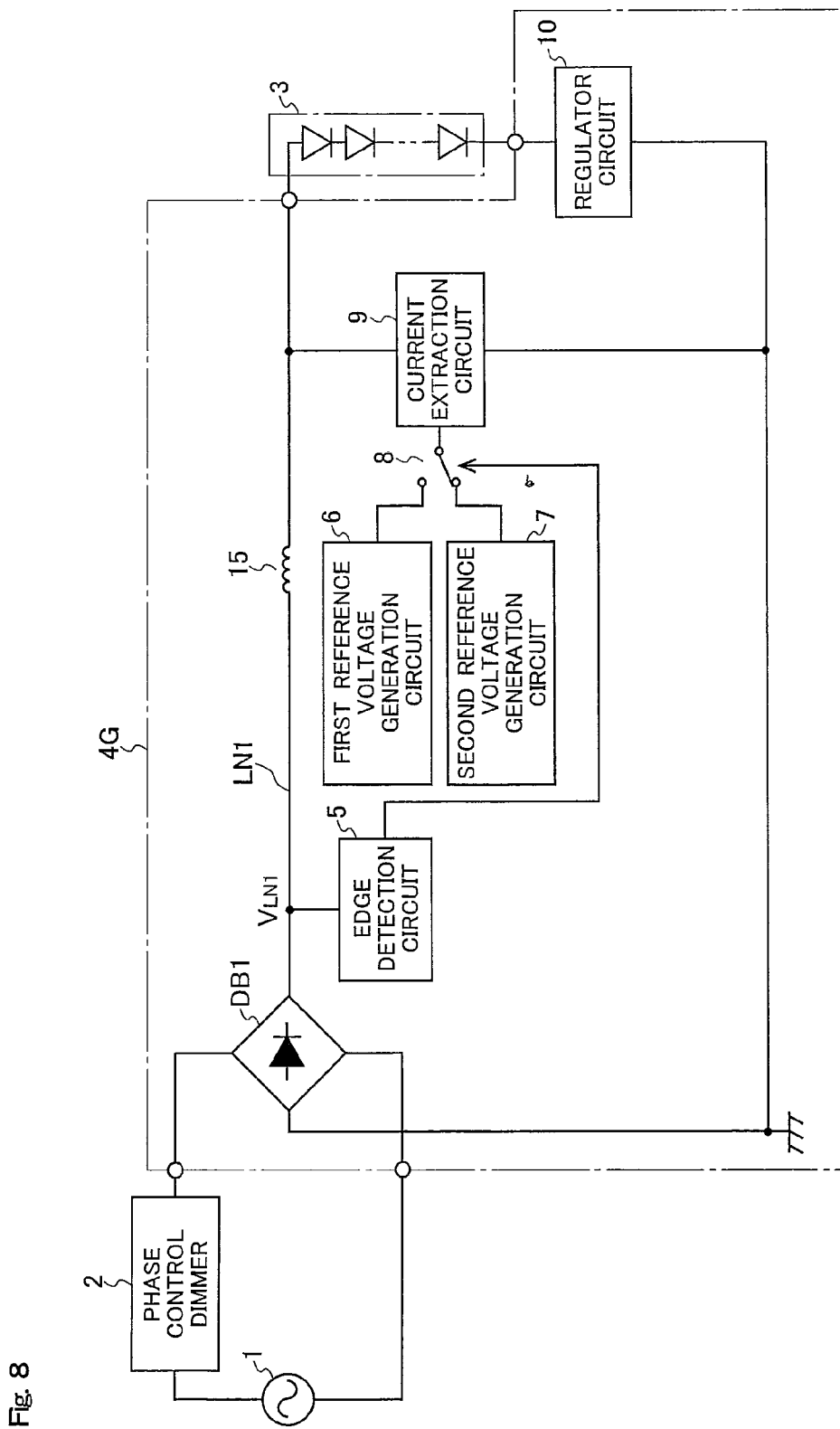
FIG. 8 is a view showing the configuration of the LED illumination system according to a seventh embodiment of the present invention.

FIG. 8 shows the configuration of the LED illumination system according to a seventh embodiment of the present invention. The same reference symbols are used in FIG. 8 to refer to components that are the same as those in FIG. 1, and no detailed description thereof will be given. The LED illumination system according to the seventh embodiment of the present invention shown in FIG. 8 is provided with a phase control dimmer 2, an LED module 3, and an LED drive circuit 4G. The LED drive circuit 4G is an example of the LED drive circuit according to the present invention, and has the configuration of the LED drive circuit 4A described above with the addition of a coil 15.

The coil 15 is disposed between the edge detection circuit 5 and the current extraction circuit 9 on the power supply feed line LN1. By imparting a pulse shape to the extraction current of the current extraction circuit 9, the extraction current being in accordance with the second reference voltage, energy can be stored in the coil 15, and efficiency can therefore be enhanced.

Eighth Embodiment

Figure 9:
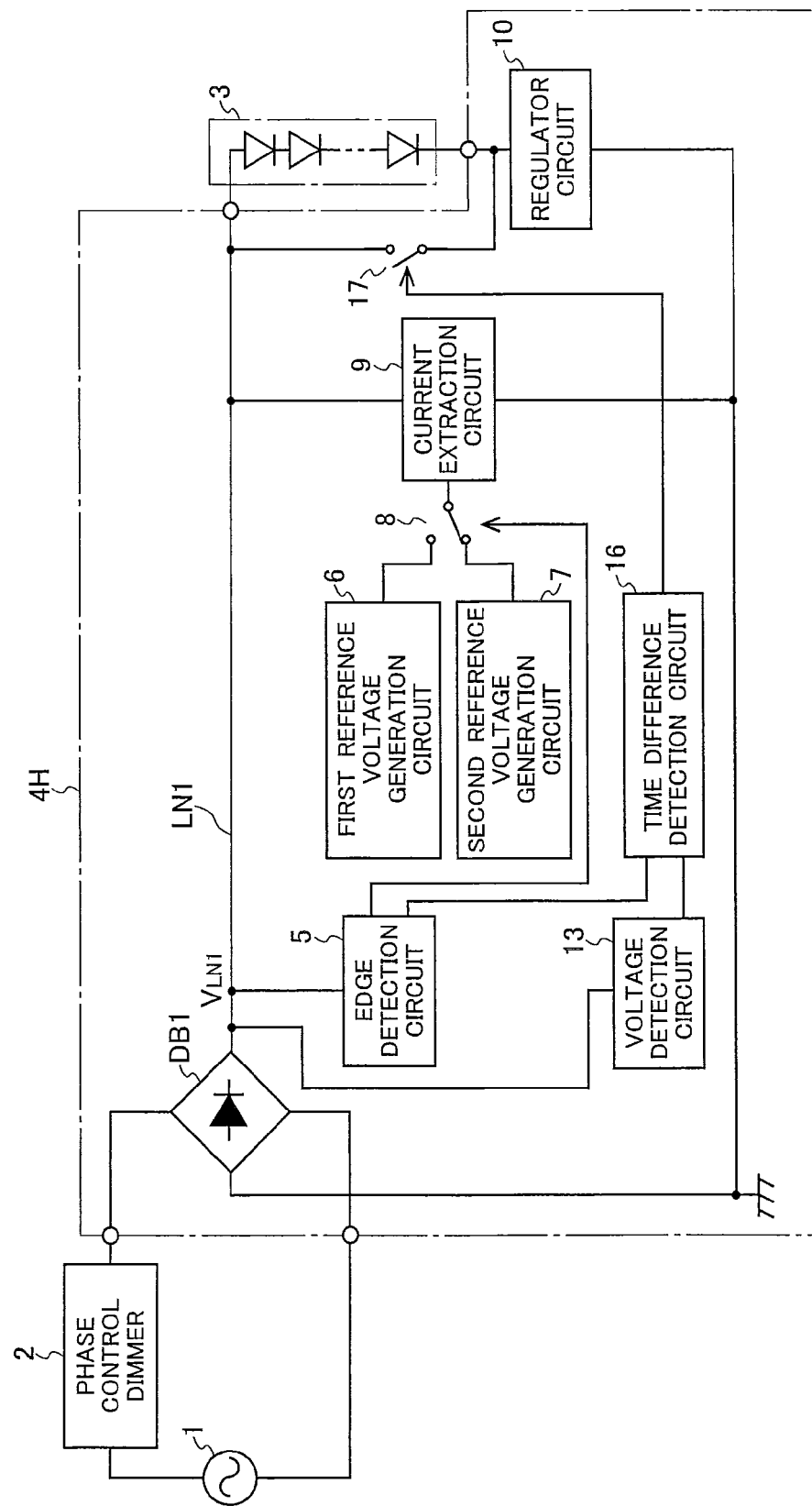
FIG. 9 is a view showing the configuration of the LED illumination system according to an eighth embodiment of the present invention.

FIG. 9 shows the configuration of the LED illumination system according to an eighth embodiment of the present invention. The same reference symbols are used in FIG. 9 to refer to components that are the same as those in FIG. 1, and no detailed description thereof will be given. The LED illumination system according to the eighth embodiment of the present invention shown in FIG. 9 is provided with a phase control dimmer 2, an LED module 3, and an LED drive circuit 4H. The LED drive circuit 4H is an example of the LED drive circuit according to the present invention, and has the configuration of the LED drive circuit 4A described above with the addition of the voltage detection circuit 13, a time difference detection circuit 16, and a switch 17.

Figure 10:
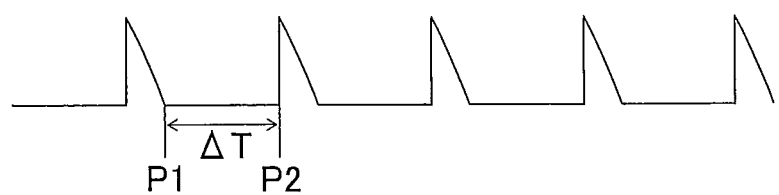
FIG. 10 is a view showing the waveform of the output voltage of the diode bridge.

The voltage detection circuit 13 detects the voltage $V_{LN1}$ of the power supply feed line LN1. The time difference detection circuit 16 detects the time difference $\Delta T$ (see FIG. 10) between a point P1 at which the voltage $V_{LN1}$ reaches a value near zero, and a point P2 at which the voltage $V_{LN1}$ rapidly changes, on the basis of the detection results of the voltage detection circuit 13 and the detection results of the edge detection circuit 5.

The switch 17 is connected in parallel to the LED module 3, and switches on when the time difference $\Delta T$ detected by the voltage detection circuit 13 is equal to or greater than a set range. In the present embodiment, the LED module 3 is completely extinguished when the triac Tri1 of the phase control dimmer 2 switches from off to on in a large phase. Consequently, the present embodiment is an effective counter-measure for cases in which an LED does not extinguish when the output of the phase control dimmer 2 is narrowed.

Ninth Embodiment

Figure 11:
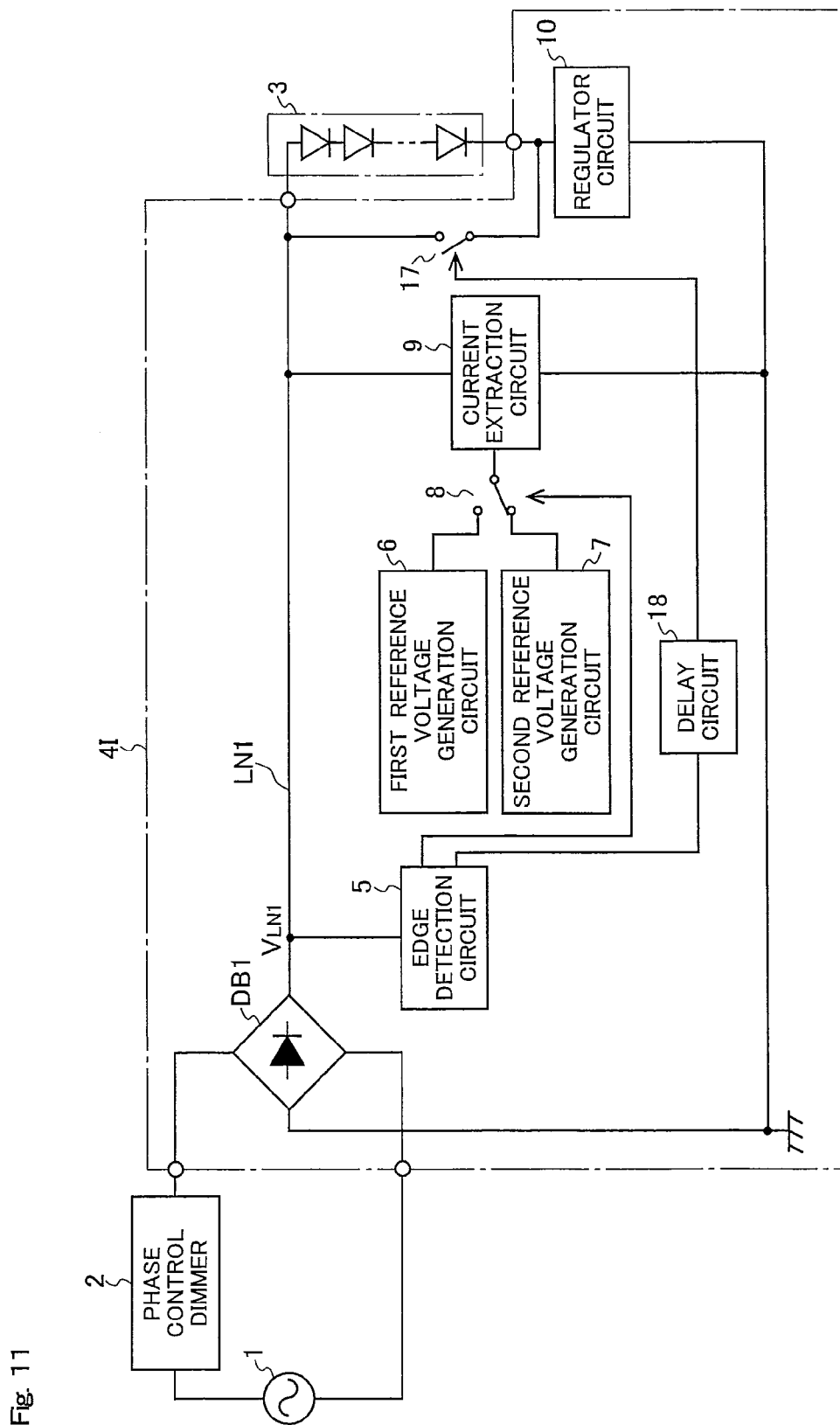
FIG. 11 is a view showing the configuration of the LED illumination system according to a ninth embodiment of the present invention.

FIG. 11 shows the configuration of the LED illumination system according to a ninth embodiment of the present invention. The same reference symbols are used in FIG. 11 to refer to components that are the same as those in FIG. 1, and no detailed description thereof will be given. The LED illumination system according to the ninth embodiment of the present invention shown in FIG. 11 is provided with a phase control dimmer 2, an LED module 3, and an LED drive circuit 4I. The LED drive circuit 41 is an example of the LED drive circuit according to the present invention, and has the configuration of the LED drive circuit 4A described above with the addition of the switch 17 and a delay circuit 18.

The delay circuit 18 is a circuit for delaying the output of the edge detection circuit 5. The switch 17 is connected in parallel to the LED module 3, and operates in accordance with the output of the delay circuit 18. The switch 17 switches from on to off when a certain time has elapsed after detection of an edge by the edge detection circuit 5.

The configuration of the present embodiment is effective as a measure for preventing the LED module 3 from momentarily lighting immediately after a main switch (not shown) for turning on illumination is switched on in a state in which the output of the phase control dimmer 2 is narrowed.

Tenth Embodiment

Figure 12:
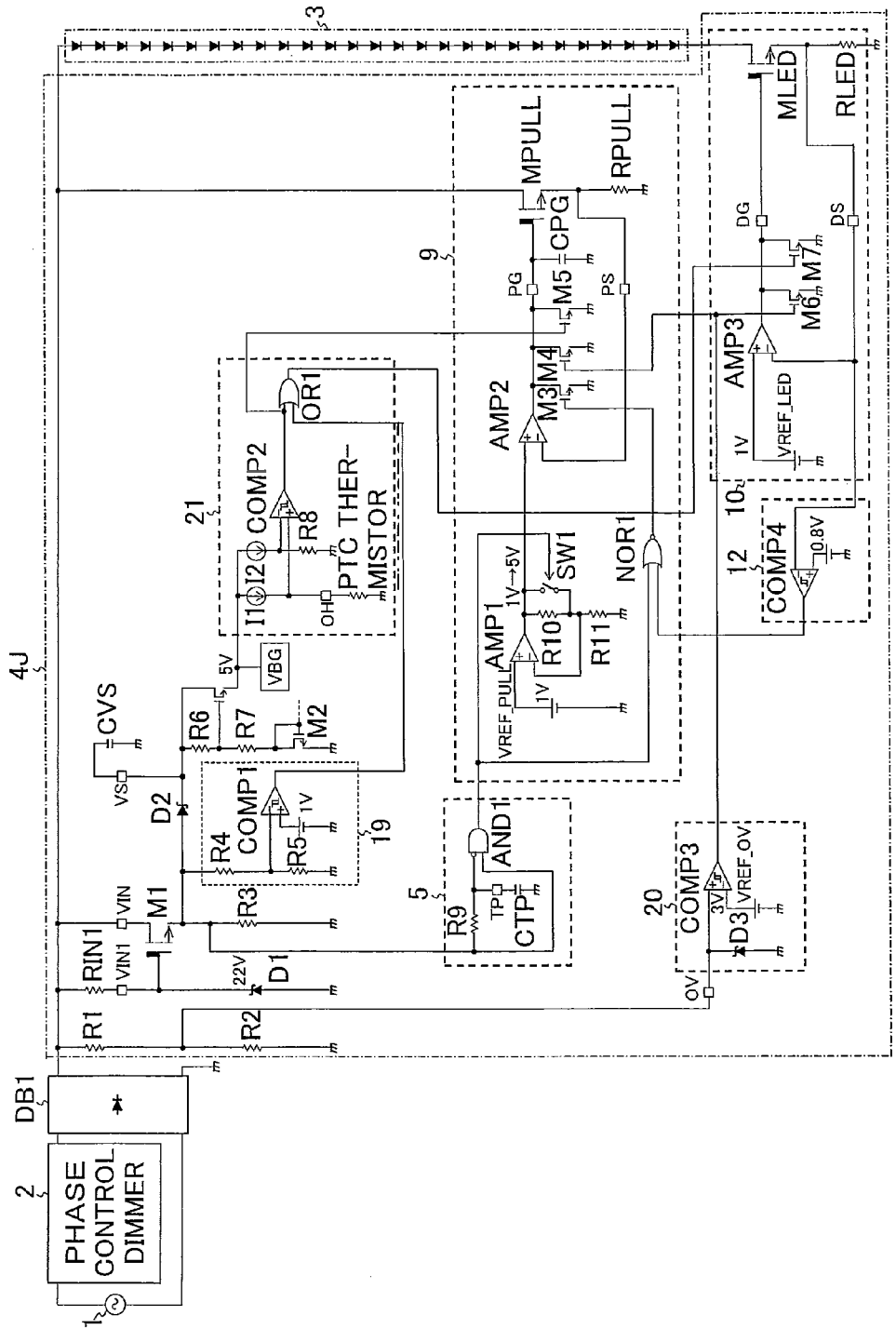
FIG. 12 is a view showing the configuration of the LED illumination system according to a tenth embodiment of the present invention.

FIG. 12 shows the configuration of the LED illumination system according to a tenth embodiment of the present invention. The same reference symbols are used in FIG. 12 to refer to components that are the same as those in FIG. 1, and no detailed description thereof will be given. The LED illumination system according to the tenth embodiment of the present invention shown in FIG. 12 is provided with a phase control dimmer 2, an LED module 3, and an LED drive circuit 4J. The LED drive circuit 4J is an example of the LED drive circuit according to the present invention, and has the edge detection circuit 5, a current extraction circuit 9', the regulator circuit 10, the current detection circuit 12, a low power supply voltage protection circuit 19, an overvoltage protection circuit 20, and a heat protection circuit 21. The current extraction circuit 9' corresponds to a circuit composed of the first reference voltage generation circuit 6, the second reference voltage generation circuit 7, the switch 8, and the current extraction circuit 9 shown in FIG. 1.

When the output voltage of the diode bridge DB1 increases, a current flows to a Zener diode D1 via a starting resistor RIN1, and a Zener voltage (22 V) occurs at the gate of a high-voltage MOS transistor M1. The input terminal of the edge detection circuit 5 is connected to the source of the high-voltage MOS transistor M1, and from the source of the high-voltage MOS transistor M1 is outputted a voltage obtained by reducing the gate voltage of the high-voltage MOS transistor M1 by an amount commensurate with the gate-source voltage of the high-voltage MOS transistor M1.

Consequently, when the output of the phase control dimmer 2 rises, a step-shaped voltage is inputted to the edge detection circuit 5. In the edge detection circuit 5, the input voltage of the edge detection circuit 5 is filtered by a low-pass filter composed of a resistor R9 and a capacitor CTP, and is then inverted; the resulting signal and the input voltage of the edge detection circuit 5 are multiplied in a logical product gate AND1. The edge detection circuit 5 thereby outputs a pulse signal having a certain constant pulse width in synchrony with the edge of the output voltage of the diode bridge DB1. This pulse width can be variably adjusted by appropriately selecting the resistance value of the resistor R9 and the capacitance value of the capacitor CTP.

The input signal of the current extraction circuit 9' is buffered by an amplifier AMP1 on the basis of a reference voltage VREF_PULL (1 [V]). When the output signal of the edge detection circuit 5 is high-level, a switch SW1 is off, and the output of the amplifier AMP1 is therefore as shown below.

$$(R10+R11)/R11 \times 1 [V]$$

When the output signal of the edge detection circuit 5 is low-level, the switch SW1 is on, and the output of the amplifier AMP1 is therefore 1 [V]. By configuring a setting such that R10 (resistance value):R11 (resistance value)=4:1, for example, 1 [V] and 5 [V] can be selectively outputted in the amplifier AMP1.

Through this configuration, the first reference voltage is 1 [V], the second reference voltage is 5 [V], and these reference voltages can be switched in synchrony with the edge of the output voltage of the diode bridge DB1. A constant-current circuit composed of an amplifier AMP2, a high-voltage MOS transistor MPULL, and a resistor RPULL generates an extraction current having a value in accordance with the value of the output voltage of the amplifier AMP1. In the constant-current circuit described above, feedback is applied so that the non-inverting input terminal and the inverting input terminal of the amplifier AMP2 are at the same electrical potential. The value of the extraction current (first extraction current) in accordance with the first reference voltage is therefore 1/RPULL [A].

The extraction current (second extraction current) in accordance with the second reference voltage is 5/RPULL [A].

The regulator circuit 10 is a constant-current circuit composed of an amplifier AMP3, a high-voltage MOS transistor MLED, and a resistor RLED, where the reference voltage is VREF_LED (1 [V]). Feedback is applied so that the non-inverting input terminal and the inverting input terminal of the amplifier AMP3 are at the same electrical potential. The LED drive current that flows to the LED module 3 is therefore 1/RLED [A].

The current detection circuit 12 is a circuit having as the input thereof the voltage across the high-voltage MOS transistor MLED and the resistor RLED. When the voltage across the terminals of the resistor RLED exceeds 0.8 [V], the output of the current detection circuit 12 changes to low-level, and according to a non-disjunction gate NOR1 inside the current extraction circuit 9, a MOS transistor M3 switches on, the output of the amplifier AMP2 changes to GND level, and current extraction operation is switched off.

Figure 13:
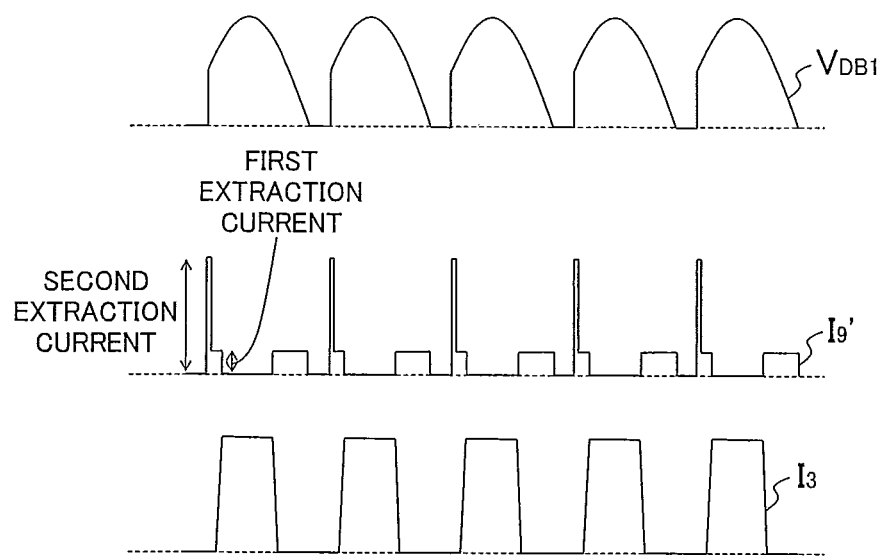
FIG. 13 is a view showing an example of the waveforms of the output voltage of the diode bridge, the extraction current, and the current which flows to the LED module.

As is apparent from the above description, through the configuration shown in FIG. 12, the first reference voltage and second reference voltage can be switched in synchrony with an edge of the output voltage of the diode bridge DB1, and the ratio of the first reference voltage and second reference voltage can be freely set by determining the resistance ratio of the resistor R10 and resistor R11 as desired. A configuration may be adopted in which the resistance value of the resistor R10 is varied by an external input to vary the ratio of the first reference voltage and the second reference voltage. FIG. 13 shows an example of the waveforms of the output voltage $V_{DB1}$ of the diode bridge DB1, the extraction current $I_9$, and the current $1_3$ which flows to the LED module 3.

By configuring the amplifier AMP2 as a current output-type operational amplifier and inserting a capacitor CPG between the output of the amplifier AMP2 and GND, it is possible to control the rising and falling time of the waveform of the extraction current which is in accordance with the second reference voltage. Depending on the type of the phase control dimmer 2, when a steep change occurs in the extraction current which is in accordance with the second reference voltage, the phase control dimmer 2 sometimes malfunctions due to resonance, and flickering occurs during dimming. Malfunctioning of the phase control dimmer 2 can therefore be prevented by moderating the change in the extraction current.

Eleventh Embodiment

Figure 14:
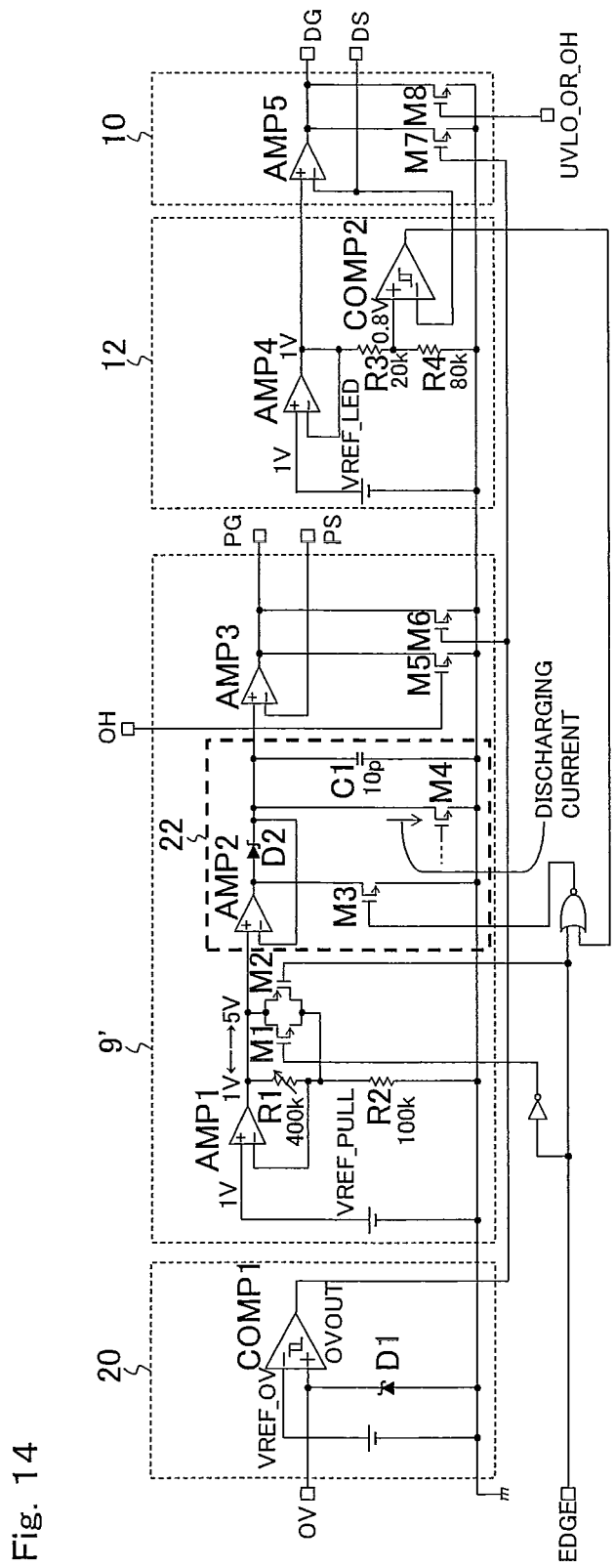
FIG. 14 is a view showing the configuration of the LED illumination system according to an eleventh embodiment of the present invention.

FIG. 14 shows the relevant parts of the configuration of the LED illumination system according to an eleventh embodiment of the present invention. The LED illumination system according to the eleventh embodiment shown in FIG. 14 has the configuration of the LED illumination system according to the tenth embodiment of the present invention shown in FIG. 12, wherein the specific configuration of the current extraction circuit 9', the regulator circuit 10, and the current detection circuit 12 is changed.

Figure 15:
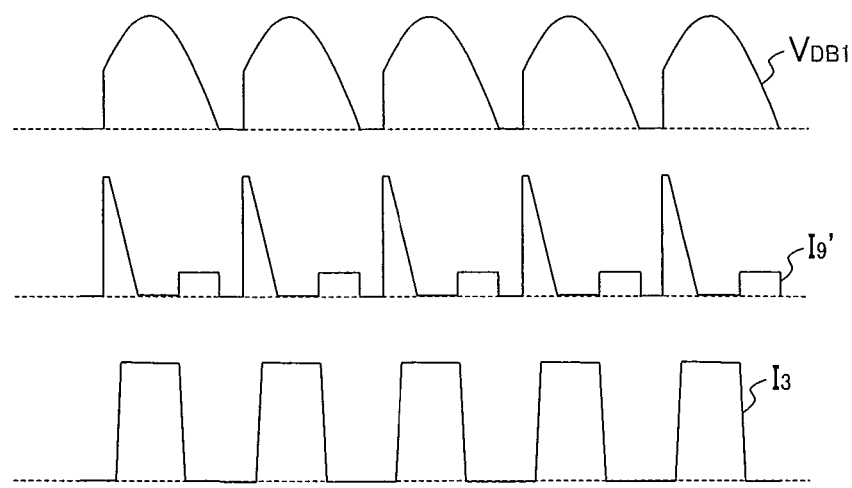
FIG. 15 is a view showing an example of the waveforms of the output voltage of the diode bridge, the extraction current, and the current which flows to the LED module.

In the present embodiment, the current extraction circuit 9' has a trapezoidal-wave generating circuit 22. The trapezoidal-wave generating circuit 22 is provided with an operational amplifier AMP2, a diode D2, an NMOS transistor M3, an NMOS transistor M4, and a capacitor C1, and the falling time of the extraction current (second extraction current) which is in accordance with the second reference voltage can be set as needed by the discharging current of the NMOS transistor M4. The falling time of the second extraction current is thereby lengthened, as shown in FIG. 15, and malfunctioning of the phase control dimmer 2 that accompanies steep current changes can be prevented.

Twelfth Embodiment

Figure 16:
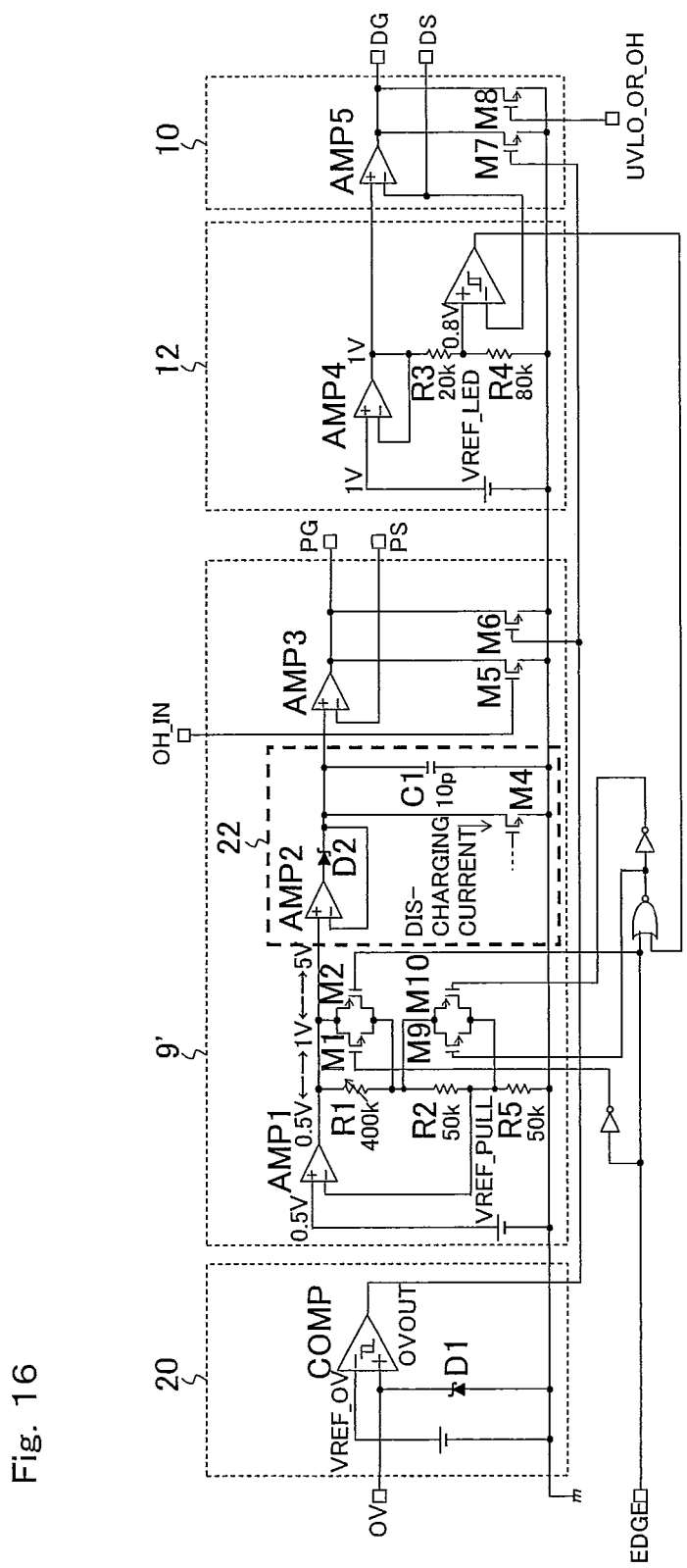
FIG. 16 is a view showing the configuration of the LED illumination system according to a twelfth embodiment of the present invention.

FIG. 16 shows the relevant parts of the configuration of the LED illumination system according to a twelfth embodiment of the present invention. The LED illumination system according to the twelfth embodiment shown in FIG. 16 has the configuration of the LED illumination system according to the tenth embodiment of the present invention shown in FIG. 12, wherein the specific configuration of the current extraction circuit 9', the regulator circuit 10, and the current detection circuit 12 is changed.

Figure 17:
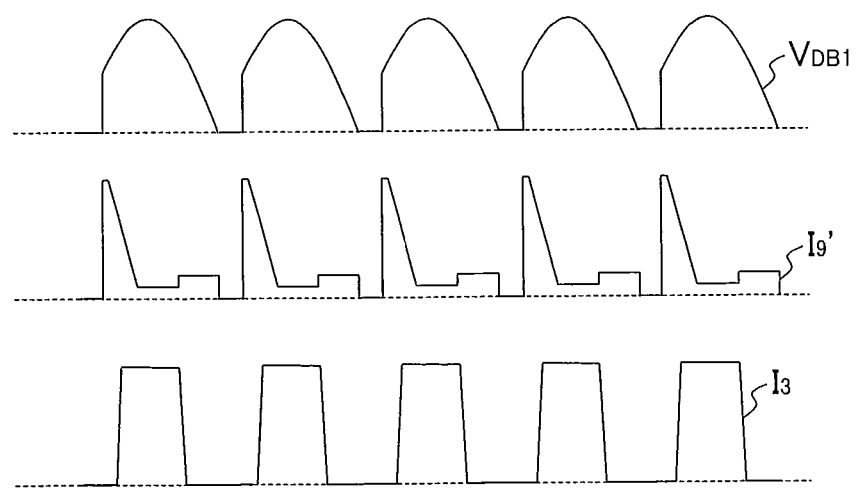
FIG. 17 is a view showing an example of the waveforms of the output voltage of the diode bridge, the extraction current, and the current which flows to the LED module.

In the present embodiment, by providing three levels to the switching of the reference voltage for setting the value of the extraction current of the current extraction circuit 9', an extraction current (third extraction current) which is in accordance with a third reference voltage can be generated when an LED of the LED module 3 is on, and the value of the extraction current (third extraction current) which is in accordance with the third reference voltage can be set to ½ of the extraction current (first extraction current) which is in accordance with the first reference voltage, for example. FIG. 17 shows an example of the waveforms of the output voltage $V_{DB1}$ of the diode bridge DB1, the extraction current $I_9$, and the current $I_3$ which flows to the LED module 3.

The present embodiment is effective in an LED illumination fixture in which the LED drive current is small, and in a case in which the LED drive current alone is insufficient to produce an extraction current for preventing malfunctioning of the phase control dimmer 2, the extraction current is kept from decreasing completely to zero when an LED of the LED module 3 is on, and an adequate extraction current from the perspective of the phase control dimmer 2 is ensured.

Modifications

The input voltage of the LED drive circuit of the present invention is not limited to the Japanese domestic commercial power supply voltage of 100 V. By setting the circuit constant of the LED drive circuit of the present invention to the appropriate value, an overseas commercial power supply voltage or a stepped-down alternating-current voltage can be used as the input voltage of the LED drive circuit of the present invention. In the fifth embodiment, a single type of LED drive circuit can be compatible with a variety of commercial power supplies, as described above.

A safer LED drive circuit can also be provided by adding a current fuse or other protective element to the LED drive circuit of the present invention.

In the configuration of the LED drive circuit according to the present invention described above, the current extractor is provided to the output side of the diode bridge, but the current extractor may also be provided to the input side of the diode bridge.

The voltage inputted to the LED drive circuit of the present invention is not limited to a voltage based on a sine wave alternating-current voltage, and may be another alternating voltage.

All of the LED drive circuits described above are also provided with a diode bridge, but the diode bridge is not an essential constituent element of the LED drive circuit of the present invention. In a configuration in which a diode bridge is not provided, two LED modules are provided having mutually different forward directions, and a current extraction circuit and other components are provided for each LED module. This configuration has advantages in that there is no need for a diode bridge, the power supply efficiency is somewhat enhanced by the fact that there is no need for the diode bridge, and the duty ratio of the LED drive current is half that of a system in which the LED is driven after full-wave rectification, thereby extending the life of the LED (meaning less reduction in luminous flux). This configuration has disadvantages, however, in that the number of LED elements is doubled, thereby increasing cost.

The embodiments and modifications described above can be combined in any manner and implemented insofar as the features thereof are not incompatible with each other.

LED Illumination Fixture According to the Present Invention

Figure 18:
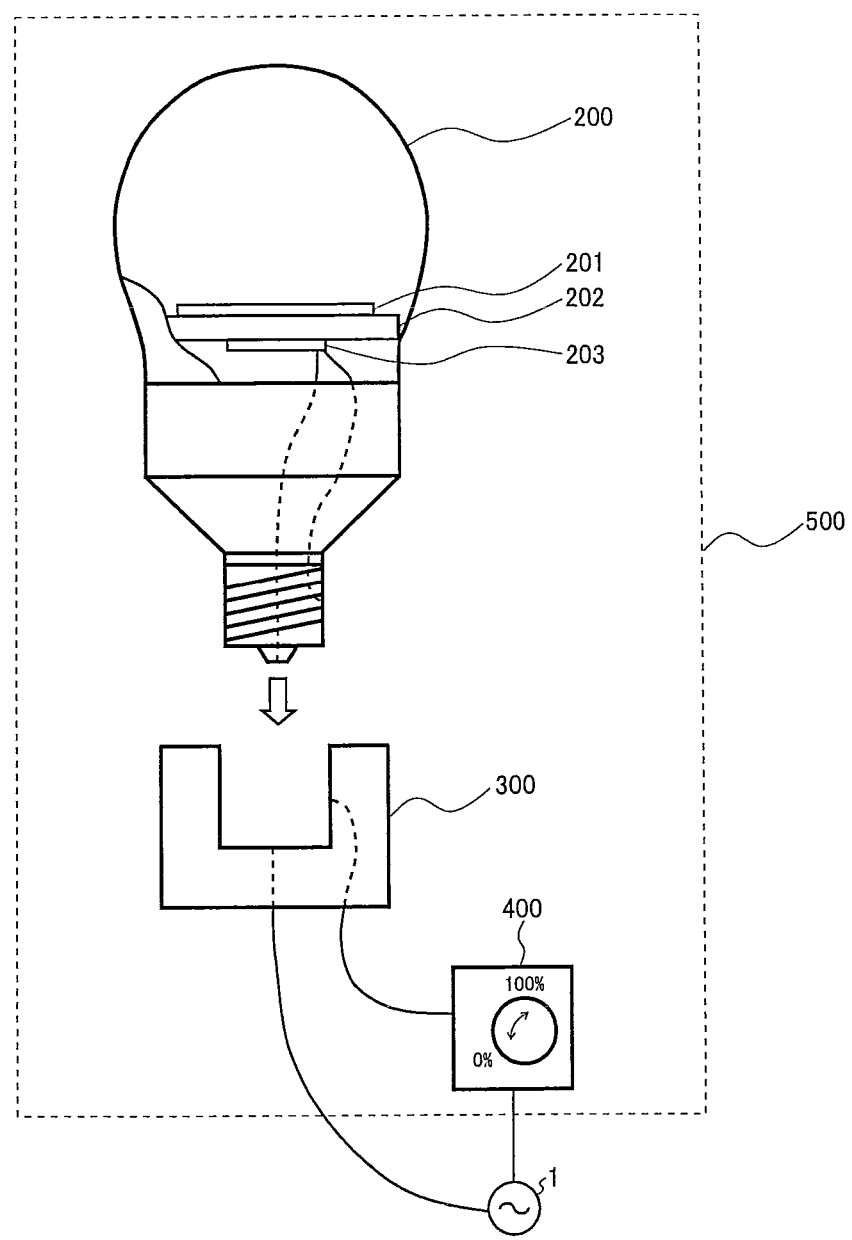
FIG. 18 is a view showing an example of the overall structure of the LED illumination fixture according to the present invention, the LED illumination device according to the present invention, and the LED illumination system according to the present invention.

Lastly, the overall structure of the LED illumination fixture of the present invention will be described. FIG. 18 shows an example of the overall structure of the LED illumination fixture according to the present invention, the LED illumination device according to the present invention, and the LED illumination system according to the present invention. FIG. 18 shows a partial cut-away view of the compact self-ballasted LED illumination fixture 200 of the present invention. A housing or substrate 202, an LED module 201 composed of one or more LED elements provided to the front surface (facing the top of the bulb) of the housing or substrate 202, and a circuit 203 provided to the back surface (facing the bottom of the bulb) of the housing or substrate 202 are provided inside the compact self-ballasted LED illumination fixture 200 of the present invention. The examples of the LED drive circuit of the present invention described above, for example, may be used in the circuit 203. The circuit 203 is not limited to the examples of the LED drive circuit according to the present invention described above, and it is apparent that the circuit 203 may be any LED drive circuit in which an alternating voltage is input and an LED is driven, and which can be connected to a phase control dimmer; the LED drive circuit comprising an edge detector for detecting an edge of the output voltage of the phase control dimmer; and a current extractor for extracting a current from a current feed line for feeding an LED drive current to the LED; wherein the value of the current extracted from the current feed line by the current extractor is varied in accordance with the detection results of the edge detector.

An LED illumination fixture mount 300 in which the compact self-ballasted LED illumination fixture 200 of the present invention is mounted, and a light controller (phase control dimmer) 400 are connected in series to the alternating-current power supply 1. The compact self-ballasted LED illumination fixture 200 of the present invention and the LED illumination fixture mount 300 constitute an LED illumination device (ceiling light, pendant light, kitchen light, recessed light, floor lamp, spotlight, foot light, or the like). The LED illumination system 500 of the present invention is formed by the compact self-ballasted LED illumination fixture 200 of the present invention, the LED illumination fixture mount 300, and the light controller 400. The LED illumination fixture mount 300 is disposed on an interior ceiling wall surface, for example, and the light controller 400 is disposed on an interior side wall surface, for example.

Since the compact self-ballasted LED illumination fixture 200 of the present invention can be attached to and detached from the LED illumination fixture mount 300, flickering or blinking of the LED that occurs when the hold current of the phase control element is inadequate because of voltage fluctuation of the power supply line in conjunction with oscillation of the output of the phase control dimmer can be reduced merely by replacing the incandescent bulb, fluorescent lamp, or other illumination fixture with the compact self-ballasted LED illumination fixture 200 of the present invention in an existing illumination device and illumination system in which a conventional incandescent bulb, fluorescent lamp, or the like was used.

Figure 20:
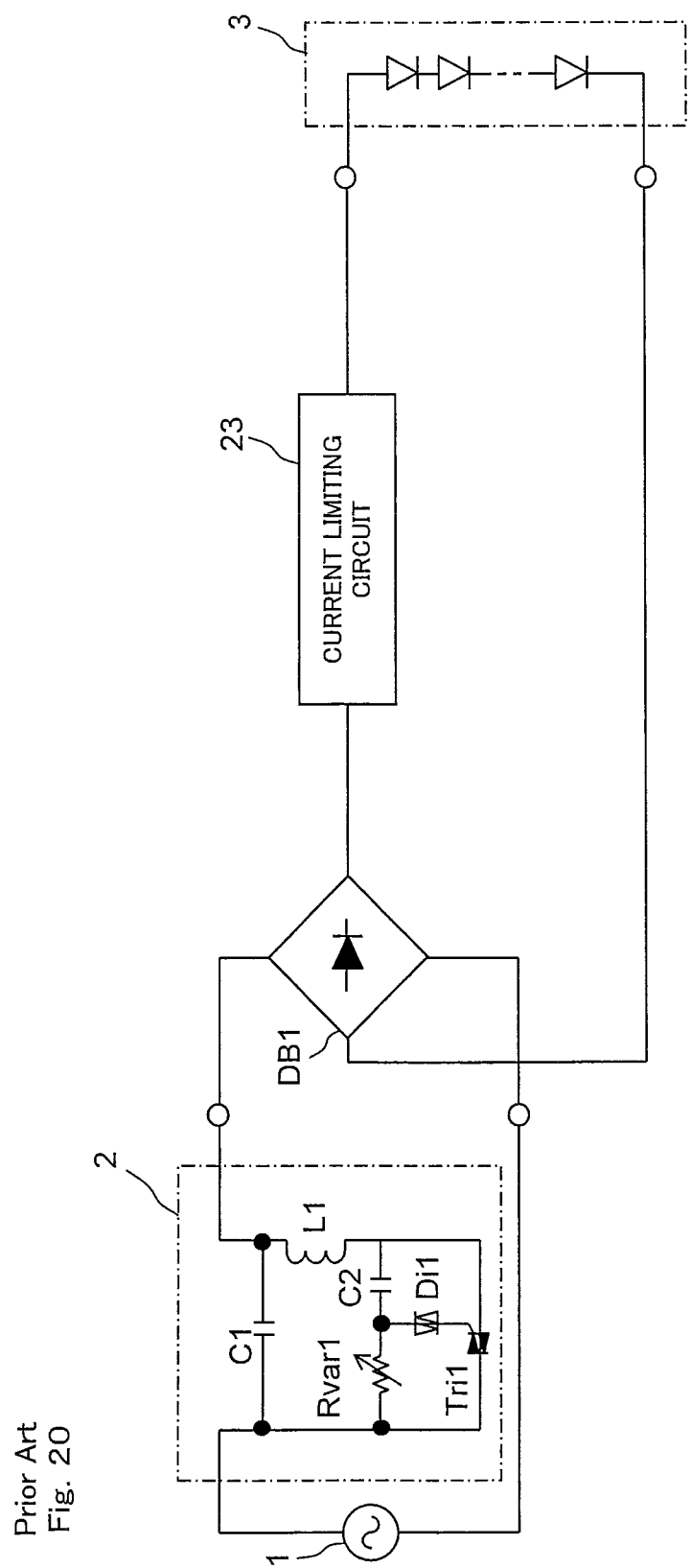
FIG. 20 is a view showing an example of the conventional LED illumination system.
Figure 21A:
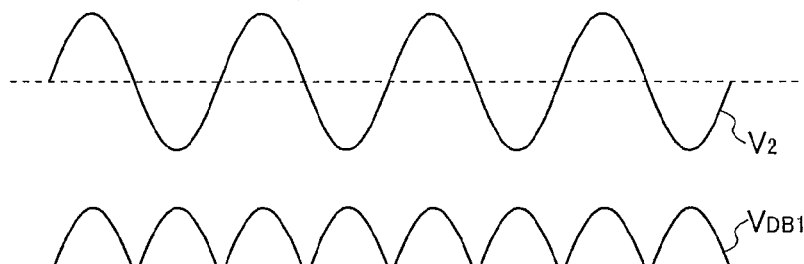
FIG. 21A is a view showing the waveform of the output voltage of the phase control dimmer, and the waveform of the output voltage of the diode bridge.
Figure 21B:
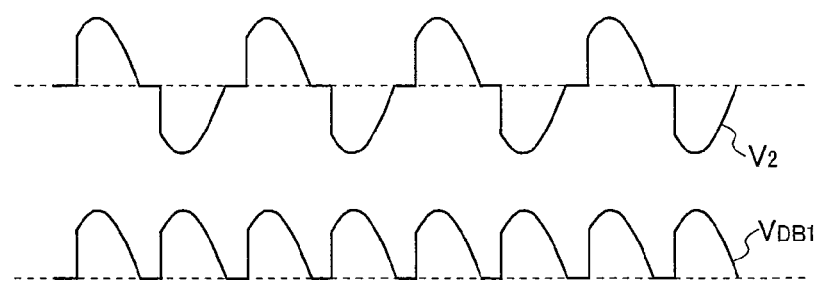
FIG. 21B is a view showing the waveform of the output voltage of the phase control dimmer, and the waveform of the output voltage of the diode bridge.
Figure 21C:
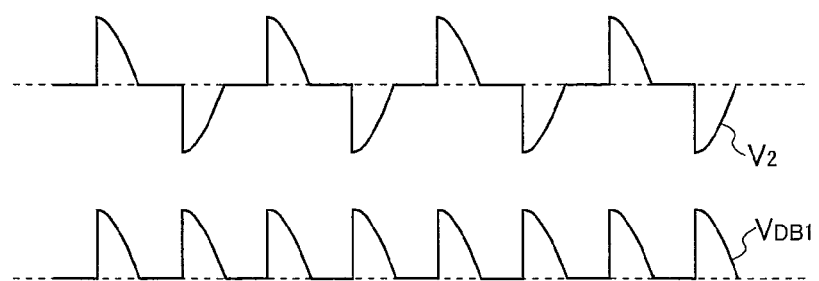
FIG. 21C is a view showing the waveform of the output voltage of the phase control dimmer, and the waveform of the output voltage of the diode bridge.
Figure 21D:
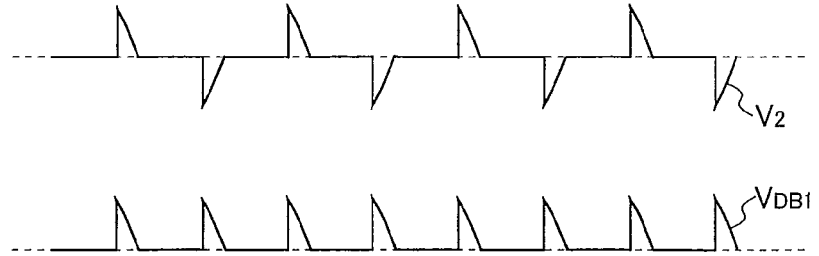
FIG. 21D is a view showing the waveform of the output voltage of the phase control dimmer, and the waveform of the output voltage of the diode bridge.
Figure 22A:
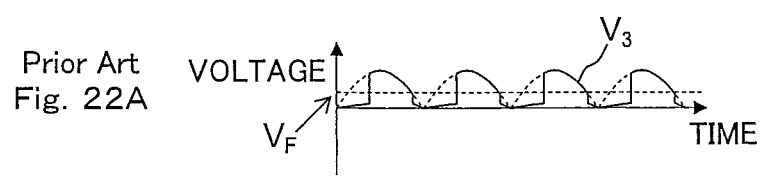
FIG. 22A is a view showing an example of the waveform of the voltage across the LED module in the LED illumination system shown in FIG. 20 in a case in which the bright dimmer level is set.
Figure 22B:
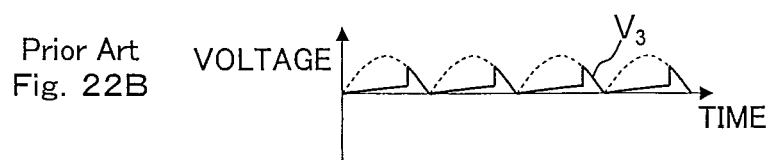
FIG. 22B is a view showing an example of the waveform of the voltage across the LED module in the LED illumination system shown in FIG. 20 in a case in which the dark dimmer level is set.
Figure 22C:
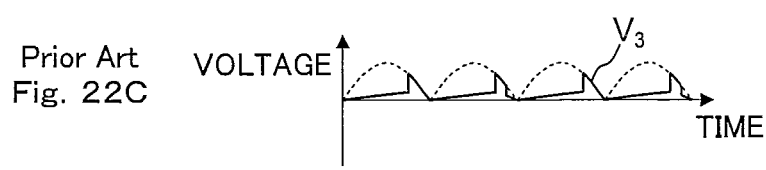
FIG. 22C is a view showing an example of the waveform of the voltage across the LED module in the LED illumination system shown in FIG. 20 in a case in which the intermediate dimmer level is set.
Figure 23A:
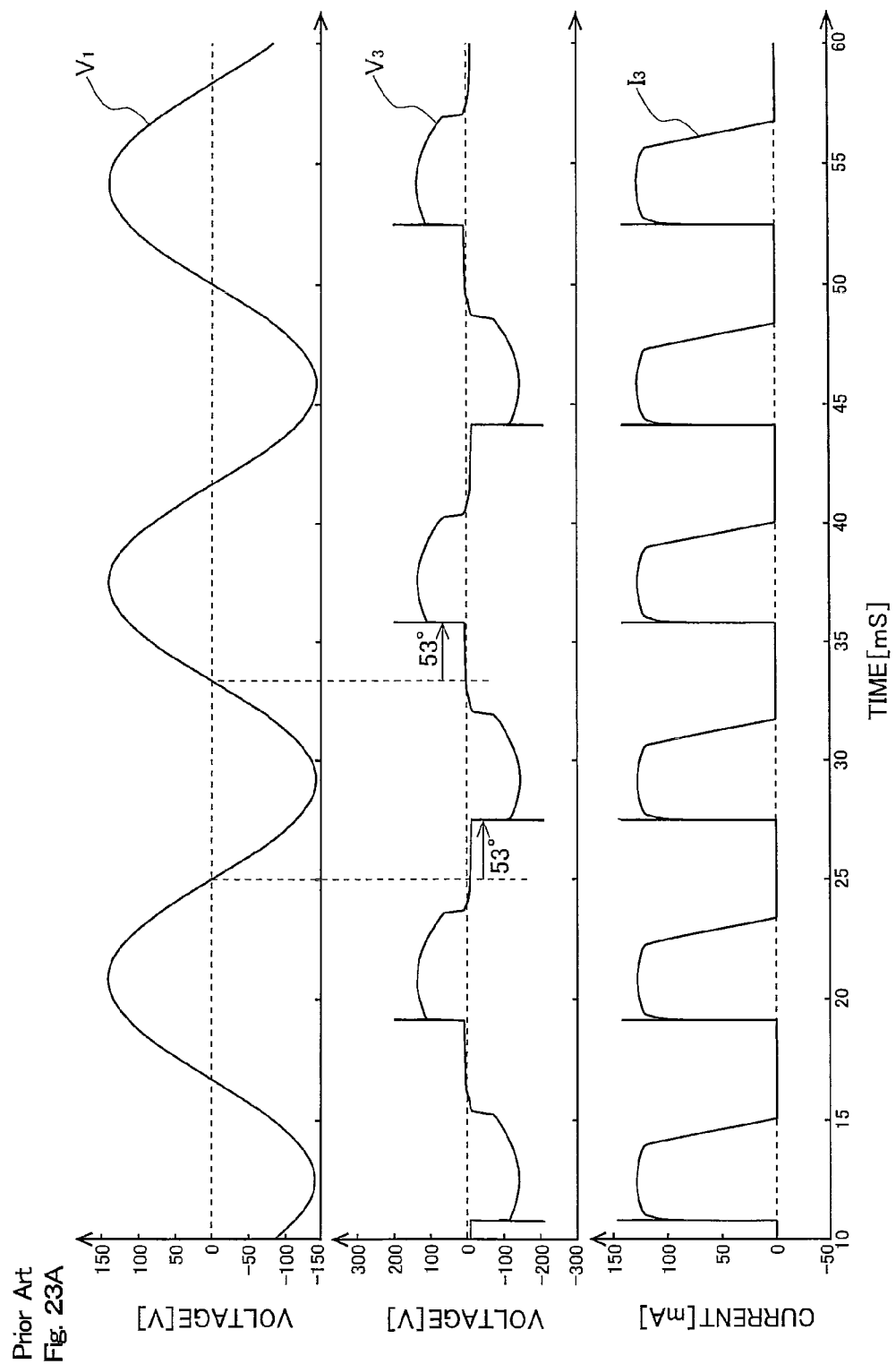
FIG. 23A is a simulation waveform diagram showing the voltage/current of each component of the LED illumination system shown in FIG. 20 in a case in which the bright dimmer level is set.
Figure 23B:
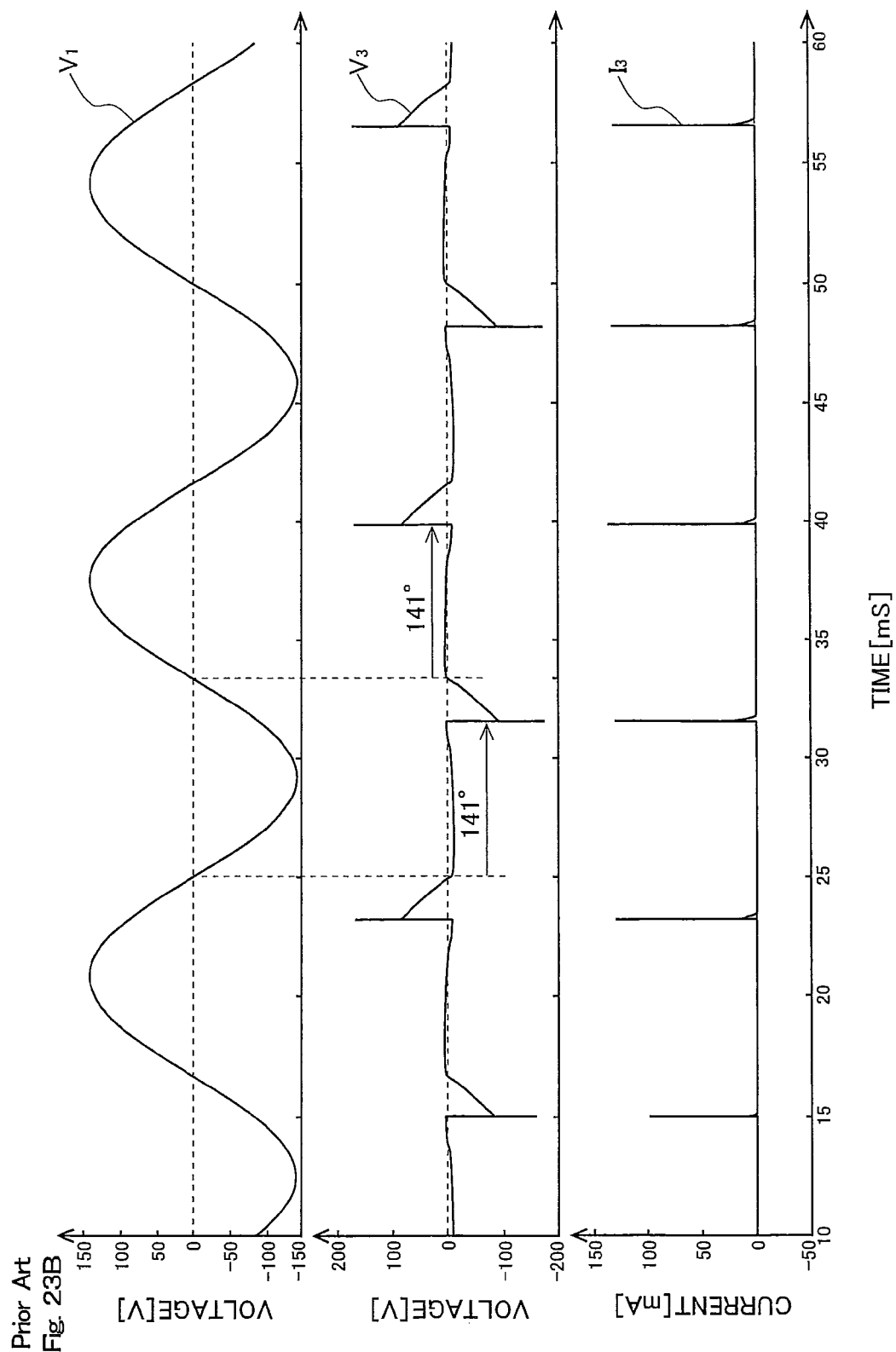
FIG. 23B is a simulation waveform diagram showing the voltage/current of each component of the LED illumination system shown in FIG. 20 in a case in which the dark dimmer level is set.
Figure 23C:
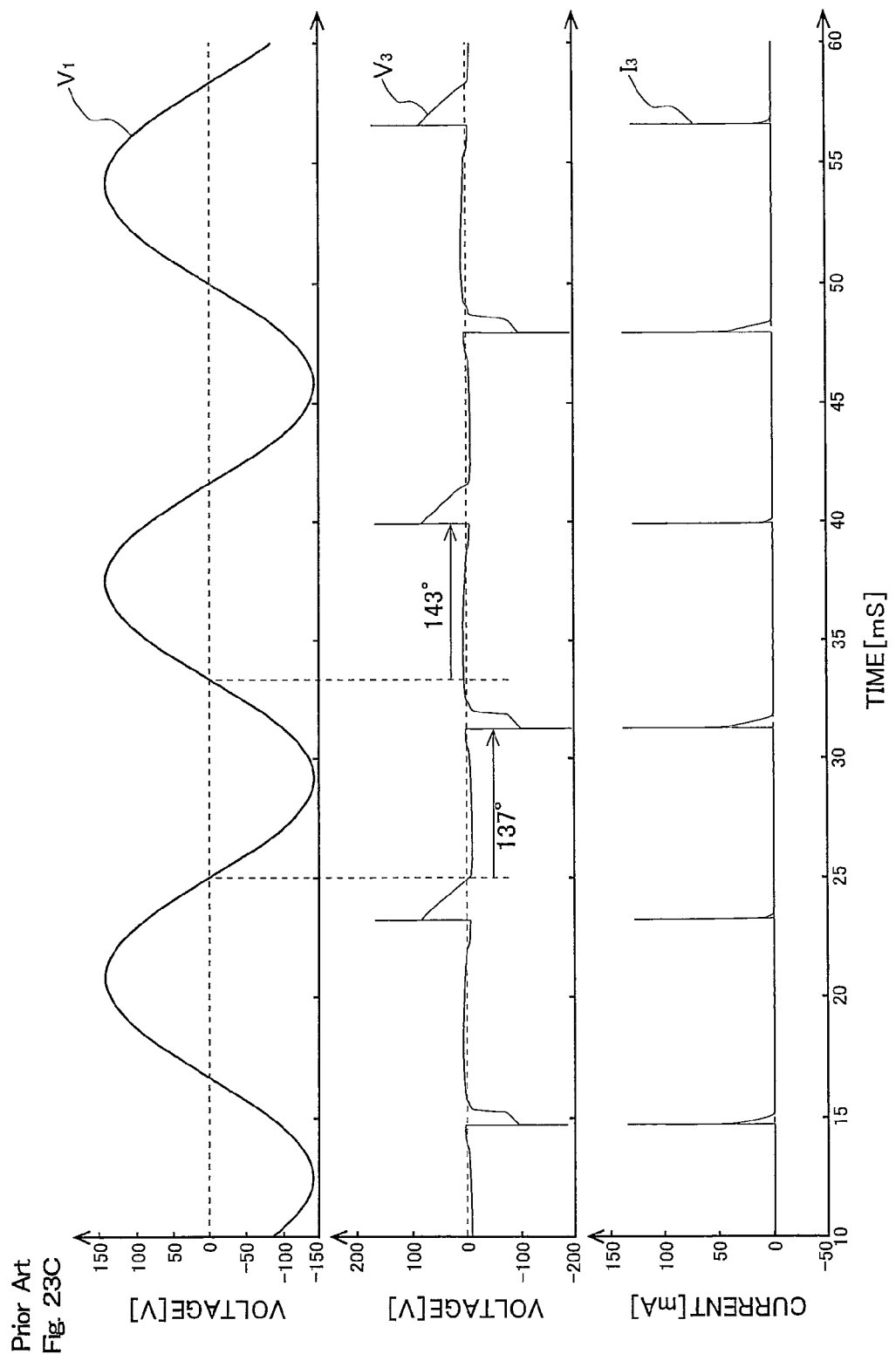
FIG. 23C is a simulation waveform diagram showing the voltage/current of each component of the LED illumination system shown in FIG. 20 in a case in which the intermediate dimmer level is set.
Figure 24:
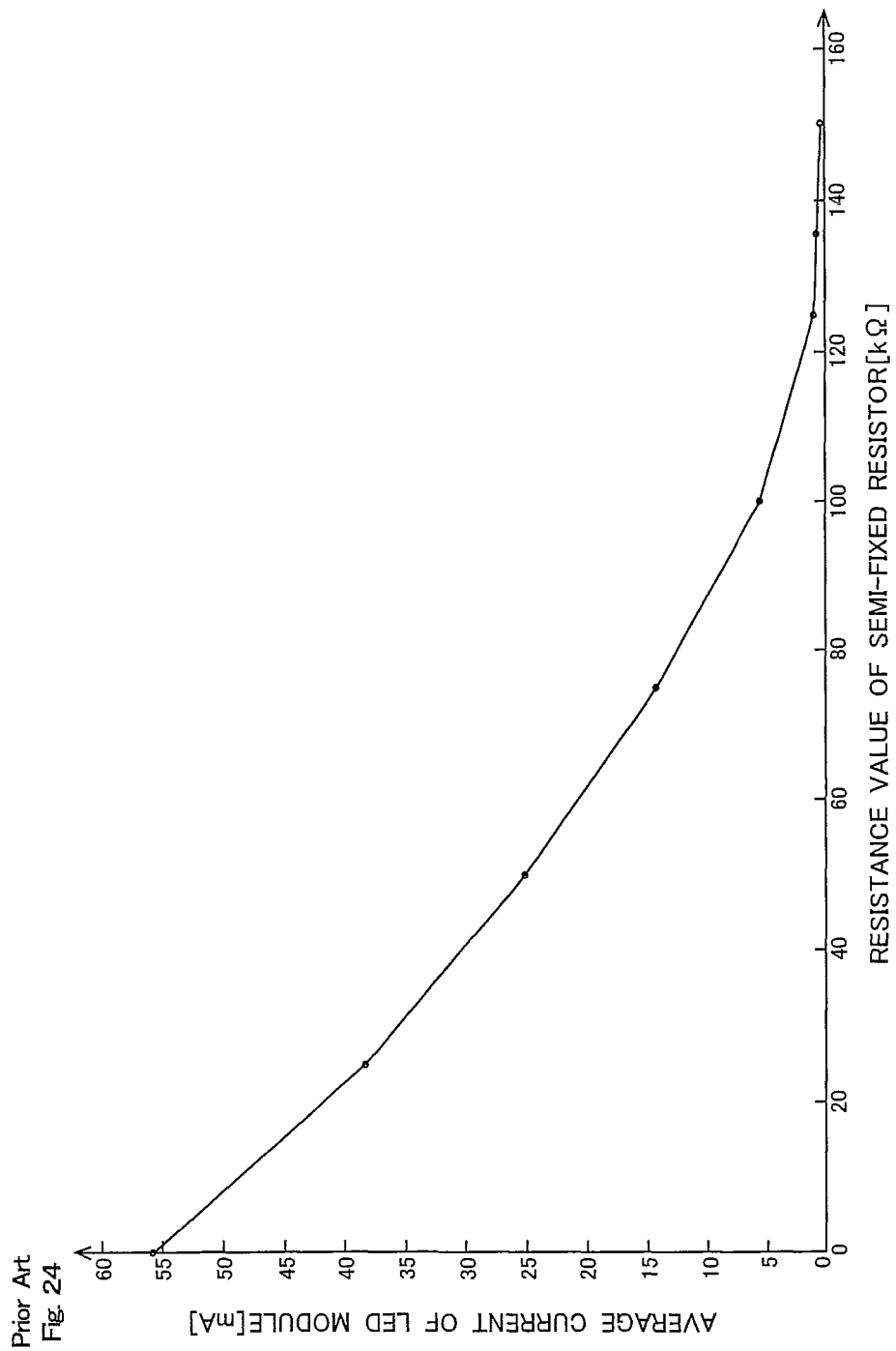
FIG. 24 is a view showing the relationship between the average current of the LED module and the resistance value of the semi-fixed resistor.

FIG. 18 shows the appearance of the light controller 400 in a case in which the light controller 400 is the phase control dimmer 2 shown in FIG. 20, and the light controller 400 is configured so that the degree of dimming can be varied by using a volume knob. A configuration may also be adopted in which the degree of dimming can be varied by using a volume slider instead of a knob.

The light controller 400 is described above as being directly operable by a person through the use of a volume knob or volume slider, but this configuration is not limiting; a person may also remotely operate the light controller 400 by using a remote control or other wireless signal. Specifically, remote operation is possible by providing a wireless signal receiver to the body of the light controller as the receiving side, and providing a transmitter body (e.g., a remote control transmitter, a mobile terminal, or the like) as the transmitting side with a wireless signal transmission unit for transmitting light control signals (e.g., a dimmer signal, a light on/off signal, and other signals) to the wireless signal receiver.

Figure 19:
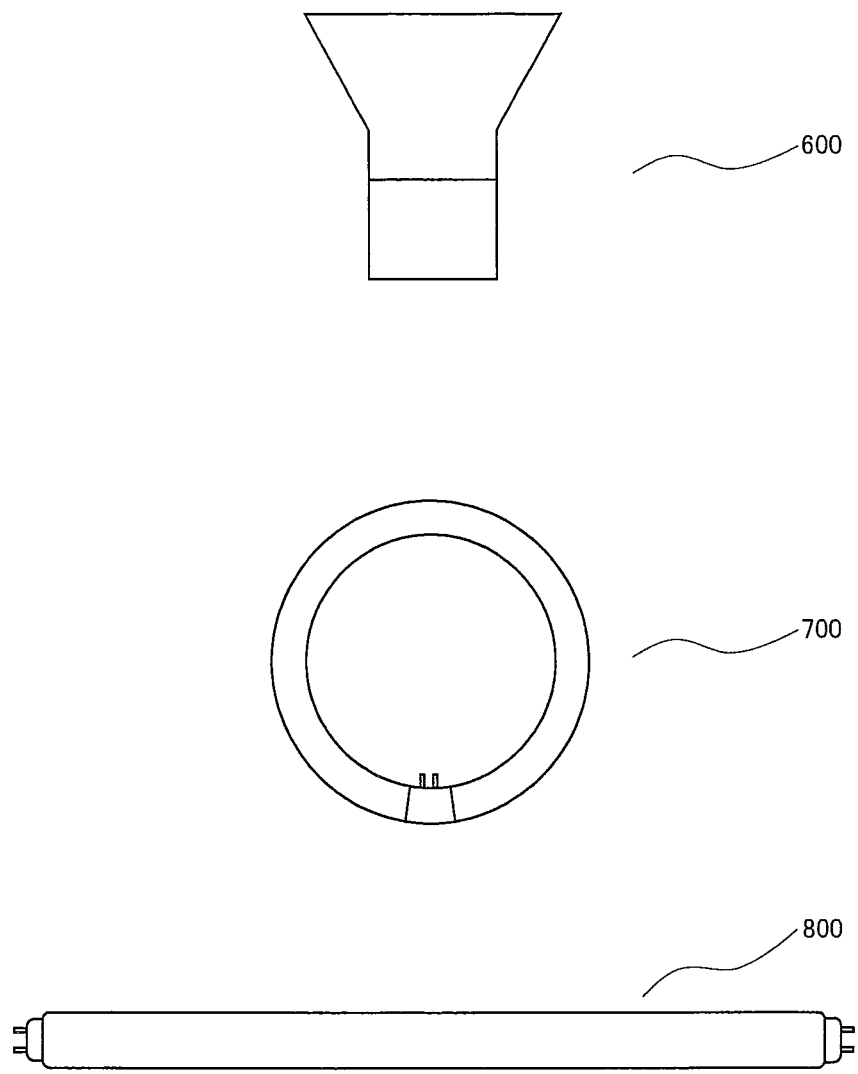
FIG. 19 is a view showing another example of the overall structure of the LED illumination fixture according to the present invention.

The LED illumination fixture of the present invention is not limited to a compact self-ballasted LED illumination fixture, and may be the lamp-type LED illumination fixture 600, the ring-type LED illumination fixture 700, or the straight tube-type LED illumination fixture 800 shown in FIG. 19. In any of these types of illumination fixtures, the LED illumination fixture of the present invention is provided inside with at least an LED and an LED drive circuit in which an alternating voltage is input and an LED is driven, and which can be connected to a phase control dimmer; the LED drive circuit comprising an edge detector for detecting an edge of the output voltage of the phase control dimmer; and a current extractor for extracting a current from a current feed line for feeding an LED drive current to the LED; wherein the value of the current extracted from the current feed line by the current extractor is varied in accordance with the detection results of the edge detector.

What is claimed is:

1. An LED drive circuit in which an alternating voltage is input and an LED is driven, and which can be connected to a phase control dimmer; the LED drive circuit comprising:
    an edge detector for detecting an edge of the output voltage of said phase control dimmer; and
    a current extractor for extracting a current from a current feed line for feeding an LED drive current to said LED; wherein
    the value of the current extracted from said current feed line by said current extractor is varied in accordance with the detection results of said edge detector.

2. The LED drive circuit according to claim 1, wherein
said current extractor extracts a first extraction current from said current feed line so that a phase control element inside said phase control dimmer does not switch off before said alternating voltage reaches 0 V after the on/off state of the phase control element inside said phase control dimmer switches and said LED emits light; and
said current extractor extracts a second extraction current having a different value than said first extraction current from said current feed line for a time set in advance when said edge detector detects an edge of the output voltage of said phase control dimmer.

3. The LED drive circuit according to claim 2, wherein
said LED drive circuit switches between said first extraction current and said second extraction current by switching the value of a reference voltage used by said current extractor.

4. The LED drive circuit according to claim 1, wherein
said LED drive circuit does not operate said current extractor in a case in which said edge detector does not detect an edge of the output voltage of said phase control dimmer for a certain period of time.

5. The LED drive circuit according to claim 2, wherein
said LED drive circuit comprises a current detector for detecting said LED drive current; and
said LED drive circuit controls the on/off state of the current extraction operation of said current extractor by said first extraction current in accordance with the detection results of said current detector.

6. The LED drive circuit according to claim 2, wherein
said LED drive circuit comprises a current detector for detecting said LED drive current; and
said LED drive circuit varies the value of said first extraction current in accordance with the detection results of said current detector.

7. The LED drive circuit according to claim 2, wherein
said LED drive circuit comprises a voltage detector for detecting said alternating voltage or a voltage obtained by rectifying said alternating voltage; and
said LED drive circuit varies the value of said first extraction current and the value of said second extraction current in accordance with the detection results of said voltage detector.

8. The LED drive circuit according to claim 1, wherein
said edge detector is capable of distinguishing between a rising edge and a falling edge.

9. The LED drive circuit according to claim 2, wherein
a coil is provided further toward the input side of said current feed line than said current extractor; and
said second extraction current has a pulse-shaped waveform.

10. The LED drive circuit according to claim 1; wherein
said LED drive circuit comprises:
    a voltage detector for detecting said alternating voltage or a voltage obtained by rectifying said alternating voltage; and
    a time difference detector for detecting a time difference between a point at which said alternating voltage reaches a near-zero value and a point at which said alternating voltage rapidly changes, in accordance with the detection results of said voltage detector and the detection results of said edge detector; and
said LED drive circuit switches between short-circuiting and not short-circuiting said LED in accordance with the detection results of said time difference detector.

11. The LED drive circuit according to claim 1, wherein
said LED drive circuit comprises a delay unit for delaying the output of said edge detector; and
said LED drive circuit switches between short-circuiting and not short-circuiting said LED in accordance with the output of said delay unit.

12. The LED drive circuit according to claim 2, wherein
said current extractor has a falling time changing unit capable of changing the falling time of said second extraction current.

13. The LED drive circuit according to claim 12, wherein
said falling time changing unit has an error amplifier connected to a current output operational amplifier, and a capacitor connected to an output of said error amplifier.

14. The LED drive circuit according to claim 12, wherein
said falling time changing unit has a peak hold circuit and a discharge circuit.

15. The LED drive circuit according to claim 12, wherein said LED drive circuit does not switch off the current extraction operation by said first current extraction when said LED is on.

16. An LED illumination fixture comprising:
an LED drive circuit; and
an LED connected to an output side of said LED drive circuit;
wherein
said LED drive circuit is an LED drive circuit in which an alternating voltage is input and said LED is driven, and which can be connected to a phase control dimmer; the LED drive circuit comprising:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

17. An LED illumination device comprising:
an LED drive circuit;
wherein
said LED drive circuit is an LED drive circuit in which an alternating voltage is input and said LED is driven, and which can be connected to a phase control dimmer; the LED drive circuit comprising:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

18. An LED illumination device comprising:
an LED illumination fixture;
wherein
said LED illumination fixture is an LED illumination fixture comprising:
an LED drive circuit; and
an LED connected to an output side of said LED drive circuit;
wherein
said LED drive circuit is an LED drive circuit in which an alternating voltage is input and said LED is driven, and which can be connected to a phase control dimmer; the LED drive circuit comprising:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

19. An LED illumination system comprising:
an LED illumination fixture; and
a phase control dimmer connected to an input side of said LED illumination fixture;
wherein
said LED illumination fixture is an LED illumination fixture having:
an LED drive circuit; and
an LED connected to an output side of said LED drive circuit;
wherein
said LED drive circuit is an LED drive circuit in which an alternating voltage is input and said LED is driven, and which can be connected to a phase control dimmer; the LED drive circuit comprising:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

20. An LED illumination system comprising:
an LED illumination device; and
a phase control dimmer connected to an input side of said LED illumination device;
wherein
said LED illumination device is an LED illumination device having:
an LED drive circuit;
wherein
said LED drive circuit is an LED drive circuit in which an alternating voltage is input and said LED is driven, and which can be connected to a phase control dimmer; the LED drive circuit having:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

21. An LED illumination system comprising:
an LED illumination device; and
a phase control dimmer connected to an input side of said LED illumination device;
wherein
said LED illumination device is an LED illumination device having:
an LED illumination fixture;
wherein
said LED illumination fixture is an LED illumination fixture having:
an LED drive circuit; and
an LED connected to an output side of said LED drive circuit;
wherein
said LED drive circuit is an LED drive circuit in which an alternating voltage is input and said LED is driven, and which can be connected to a phase control dimmer; the LED drive circuit having:
an edge detector for detecting an edge of the output voltage of said phase control dimmer; and
a current extractor for extracting a current from a current feed line for feeding an LED drive current to said LED;
wherein
the value of the current extracted from said current feed line by said current extractor is varied in accordance with the detection results of said edge detector.

* * * * *